United States Patent
Karaoguz et al.

(10) Patent No.: US 8,823,782 B2
(45) Date of Patent: Sep. 2, 2014

(54) REMOTE CONTROL WITH INTEGRATED POSITION, VIEWER IDENTIFICATION AND OPTICAL AND AUDIO TEST

(75) Inventors: Jeyhan Karaoguz, Irvine, CA (US); James D. Bennett, Hroznetin (CZ); Nambirajan Seshadri, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 317 days.

(21) Appl. No.: 12/982,102

(22) Filed: Dec. 30, 2010

(65) Prior Publication Data

US 2011/0164188 A1 Jul. 7, 2011

Related U.S. Application Data

(63) Continuation-in-part of application No. 12/845,461, filed on Jul. 28, 2010.

(60) Provisional application No. 61/303,119, filed on Feb. 10, 2010, provisional application No. 61/291,818, filed on Dec. 31, 2009.

(51) Int. Cl.
 *H04N 13/04* (2006.01)
 *H04N 9/47* (2006.01)

(52) U.S. Cl.
 CPC ....... *H04N 13/0497* (2013.01); *H04N 13/0404* (2013.01)
 USPC .............................................. 348/51; 348/53

(58) Field of Classification Search
 CPC .................................................. H04N 13/0497
 USPC .................................................... 348/41–162
 See application file for complete search history.

(56) References Cited

U.S. PATENT DOCUMENTS

| | | | |
|---|---|---|---|
| 4,829,365 A | 5/1989 | Eichenlaub | |
| 5,615,046 A | 3/1997 | Gilchrist | |

(Continued)

FOREIGN PATENT DOCUMENTS

| | | | |
|---|---|---|---|
| EP | 0833183 A1 | 4/1998 | |
| EP | 1662808 A1 | 5/2006 | |

(Continued)

OTHER PUBLICATIONS

Fono, et al.,"EyeWindows: Evaluation of Eye-Controlled Zooming Windows for Focus Selection", CHI 005, Papers: Eyes on Interaction, Portland, Oregon, Apr. 2-7, 2005, pp. 151-160.

(Continued)

*Primary Examiner* — Joseph Ustaris
*Assistant Examiner* — Talha Nawaz
(74) *Attorney, Agent, or Firm* — Fiala & Weaver P.L.L.C.

(57) ABSTRACT

Remote control devices that support interaction by a viewer with a screen assembly of a display device are provided. The eyes of the viewer have a first position within a premises relative to the screen assembly of the display device. The remote control device has a second position within the premises relative to the screen assembly of the display device. The remote control device includes an input interface that receives viewer input, a communication interface that supports wireless transmissions, and processing circuitry. The processing circuitry participates in a generation of location information relating to the first position of the eyes of the viewer. The processing circuitry causes the communication interface to make at least one wireless transmission relating to the generation of the location information. The processing circuitry, at least in part, causes a reconfiguration of the screen assembly based on the location information.

20 Claims, 12 Drawing Sheets

(56) References Cited

U.S. PATENT DOCUMENTS

| | | | |
|---|---|---|---|
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1* | 2/2004 | Kasahara et al. | 700/94 |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2* | 8/2006 | Wenstrand et al. | 250/221 |
| 7,123,213 B2 | 10/2006 | Yamazaki et al. | |
| 7,190,518 B1* | 3/2007 | Kleinberger et al. | 359/465 |
| 7,359,105 B2 | 4/2008 | Jacobs et al. | |
| 7,440,193 B2 | 10/2008 | Gunasekaran et al. | |
| 7,511,774 B2 | 3/2009 | Lee et al. | |
| 7,626,644 B2* | 12/2009 | Shestak et al. | 349/15 |
| 7,646,451 B2 | 1/2010 | Vogel et al. | |
| 7,692,859 B2 | 4/2010 | Redert et al. | |
| 7,885,079 B2 | 2/2011 | Chen et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,049,710 B2 | 11/2011 | Shestak et al. | |
| 8,139,024 B2 | 3/2012 | Daiku | |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,209,396 B1 | 6/2012 | Raman et al. | |
| 8,233,034 B2 | 7/2012 | Sharp et al. | |
| 8,284,119 B2 | 10/2012 | Kim et al. | |
| 8,310,527 B2 | 11/2012 | Ko et al. | |
| 8,334,933 B2* | 12/2012 | Tsukada et al. | 348/734 |
| 8,363,928 B1 | 1/2013 | Sharp | |
| 8,368,745 B2 | 2/2013 | Nam et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,441,430 B2 | 5/2013 | Lee | |
| 8,466,869 B2 | 6/2013 | Kobayashi et al. | |
| 8,487,863 B2 | 7/2013 | Park et al. | |
| 8,525,942 B2 | 9/2013 | Robinson et al. | |
| 8,587,642 B2 | 11/2013 | Shestak et al. | |
| 8,587,736 B2 | 11/2013 | Kang | |
| 8,605,136 B2* | 12/2013 | Yu et al. | 348/51 |
| 8,687,042 B2 | 4/2014 | Karaoguz et al. | |
| 2002/0010798 A1 | 1/2002 | Ben-Shaul et al. | |
| 2002/0037037 A1 | 3/2002 | Van Der Schaar | |
| 2002/0167862 A1* | 11/2002 | Tomasi et al. | 367/118 |
| 2002/0171666 A1 | 11/2002 | Endo et al. | |
| 2003/0012425 A1* | 1/2003 | Suzuki et al. | 382/154 |
| 2003/0103165 A1* | 6/2003 | Bullinger et al. | 348/569 |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1* | 12/2004 | Alden | 348/51 |
| 2005/0073472 A1 | 4/2005 | Kim et al. | |
| 2005/0128353 A1 | 6/2005 | Young et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0050785 A1 | 3/2006 | Watanabe et al. | |
| 2006/0109242 A1* | 5/2006 | Simpkins | 345/156 |
| 2006/0139448 A1 | 6/2006 | Ha et al. | |
| 2006/0139490 A1* | 6/2006 | Fekkes et al. | 348/515 |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1* | 11/2006 | Novack et al. | 713/186 |
| 2007/0002041 A1 | 1/2007 | Kim et al. | |
| 2007/0008406 A1 | 1/2007 | Shestak et al. | |
| 2007/0008620 A1 | 1/2007 | Shestak et al. | |
| 2007/0052807 A1 | 3/2007 | Zhou et al. | |
| 2007/0072674 A1* | 3/2007 | Ohta et al. | 463/37 |
| 2007/0085814 A1 | 4/2007 | Ijzerman et al. | |
| 2007/0096125 A1 | 5/2007 | Vogel et al. | |
| 2007/0097103 A1 | 5/2007 | Yoshioka et al. | |
| 2007/0097208 A1 | 5/2007 | Takemoto et al. | |
| 2007/0139371 A1 | 6/2007 | Harsham et al. | |
| 2007/0146267 A1 | 6/2007 | Jang et al. | |
| 2007/0147827 A1 | 6/2007 | Sheynman et al. | |
| 2007/0153916 A1 | 7/2007 | Demircin et al. | |
| 2007/0162392 A1 | 7/2007 | McEnroe et al. | |
| 2007/0258140 A1 | 11/2007 | Shestak et al. | |
| 2007/0270218 A1* | 11/2007 | Yoshida et al. | 463/37 |
| 2007/0296874 A1 | 12/2007 | Yoshimoto et al. | |
| 2008/0025390 A1 | 1/2008 | Shi et al. | |
| 2008/0037120 A1 | 2/2008 | Koo et al. | |
| 2008/0043096 A1 | 2/2008 | Vetro et al. | |
| 2008/0043644 A1 | 2/2008 | Barkley et al. | |
| 2008/0068329 A1 | 3/2008 | Shestak et al. | |
| 2008/0126557 A1 | 5/2008 | Motoyama et al. | |
| 2008/0133122 A1 | 6/2008 | Mashitani et al. | |
| 2008/0150853 A1 | 6/2008 | Peng et al. | |
| 2008/0165176 A1 | 7/2008 | Archer et al. | |
| 2008/0168129 A1 | 7/2008 | Robbin et al. | |
| 2008/0184301 A1* | 7/2008 | Boylan et al. | 725/40 |
| 2008/0191964 A1 | 8/2008 | Spengler | |
| 2008/0192112 A1 | 8/2008 | Hiramatsu et al. | |
| 2008/0246757 A1 | 10/2008 | Ito | |
| 2008/0259233 A1 | 10/2008 | Krijn et al. | |
| 2008/0273242 A1 | 11/2008 | Woodgate et al. | |
| 2008/0284844 A1 | 11/2008 | Woodgate et al. | |
| 2008/0303832 A1 | 12/2008 | Kim et al. | |
| 2009/0002178 A1* | 1/2009 | Guday et al. | 340/573.1 |
| 2009/0010264 A1 | 1/2009 | Zhang | |
| 2009/0051759 A1 | 2/2009 | Adkins et al. | |
| 2009/0052164 A1 | 2/2009 | Kashiwagi et al. | |
| 2009/0058845 A1 | 3/2009 | Fukuda et al. | |
| 2009/0102915 A1* | 4/2009 | Arsenich | 348/53 |
| 2009/0115783 A1 | 5/2009 | Eichenlaub | |
| 2009/0115800 A1 | 5/2009 | Berretty et al. | |
| 2009/0133051 A1* | 5/2009 | Hildreth | 725/28 |
| 2009/0138805 A1* | 5/2009 | Hildreth | 715/745 |
| 2009/0141182 A1 | 6/2009 | Miyashita et al. | |
| 2009/0167639 A1 | 7/2009 | Casner et al. | |
| 2009/0174700 A1 | 7/2009 | Daiku | |
| 2009/0232202 A1 | 9/2009 | Chen et al. | |
| 2009/0238378 A1 | 9/2009 | Kikinis et al. | |
| 2009/0244262 A1 | 10/2009 | Masuda et al. | |
| 2009/0268816 A1 | 10/2009 | Pandit et al. | |
| 2009/0319625 A1 | 12/2009 | Kouhi | |
| 2010/0007582 A1 | 1/2010 | Zalewski | |
| 2010/0066850 A1* | 3/2010 | Wilson et al. | 348/222.1 |
| 2010/0070987 A1* | 3/2010 | Amento et al. | 725/10 |
| 2010/0071015 A1* | 3/2010 | Tomioka et al. | 725/110 |
| 2010/0079374 A1* | 4/2010 | Cortenraad et al. | 345/158 |
| 2010/0097525 A1 | 4/2010 | Mino | |
| 2010/0107184 A1* | 4/2010 | Shintani | 725/10 |
| 2010/0128112 A1 | 5/2010 | Marti et al. | |
| 2010/0135640 A1 | 6/2010 | Zucker et al. | |
| 2010/0182407 A1 | 7/2010 | Ko et al. | |
| 2010/0208042 A1 | 8/2010 | Ikeda et al. | |
| 2010/0215343 A1 | 8/2010 | Ikeda et al. | |
| 2010/0225576 A1* | 9/2010 | Morad et al. | 345/156 |
| 2010/0231511 A1* | 9/2010 | Henty et al. | 345/157 |
| 2010/0238274 A1 | 9/2010 | Kim et al. | |
| 2010/0238367 A1 | 9/2010 | Montgomery et al. | |
| 2010/0245548 A1 | 9/2010 | Sasaki et al. | |
| 2010/0272174 A1 | 10/2010 | Toma et al. | |
| 2010/0302461 A1* | 12/2010 | Lim et al. | 348/734 |

(56) References Cited

U.S. PATENT DOCUMENTS

| | | |
|---|---|---|
| 2010/0306800 A1* | 12/2010 | Jung et al. .................. 725/41 |
| 2010/0309290 A1 | 12/2010 | Myers |
| 2011/0016004 A1* | 1/2011 | Loyall et al. ............. 705/14.72 |
| 2011/0043475 A1* | 2/2011 | Rigazio et al. ............... 345/173 |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1* | 6/2011 | Bennett et al. ................ 348/59 |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1* | 10/2011 | Eberl et al. ................... 340/901 |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1* | 8/2012 | Osterhout et al. ............ 345/158 |
| 2012/0235900 A1* | 9/2012 | Border et al. ................. 345/156 |
| 2012/0308208 A1 | 12/2012 | Karaoguz et al. |
| 2013/0127980 A1* | 5/2013 | Haddick et al. ............ 348/14.08 |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

Kumar et al.,"Eye Point: Practical Pointing and Selection Using Gaze and Keyboard", CHI 2007, Apr. 28-May 3, 2007, 10 pages.

EPO Communication received for European Patent Application No. 10016055.5-1904, mailed on Apr. 5, 2013, 6 pages.

"Displaying Stereoscopic 3D (S3D) with Intel HD Graphics Processors for Software Developers", Intel, Aug. 2011, pp. 1-10.

Liao, et al.,"The Design and Application of High-Resolution 3D Stereoscopic graphics Display on PC", Purdue University School of Science, 2007, 7 pages.

Ko et al., "Facial Feature Tracking and Head Orientation-Based Gaze Tracking", ETRI, 2000, 4 pages.

Ruddarraju et al., "Perceptual User Interfaces using Vision-Based Eye Tracking", ICMI, Nov. 5-7, 2003, 7 pages.

European Search Report received for European Patent application No. 10015984.7, mailed on May 3, 2011, 3 pages.

European search Report received for European Patent application No. 10016055.5, mailed on Apr. 12, 2011, 3 pages.

EPO Communication received for European Patent Application No. 10016055.May 1904, mailed on Apr. 5, 2013, 6 pages.

"How Browsers Work", retrieved from <http://taligarsiel.com/Projects/howbrowserswork1.htm> on Oct. 21, 2010, 54 pages.

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

"Wikipedia entry on "Scripting language"", retrieved on Aug. 16, 2012, 4 pages.

Peterka, Thomas, "Dynallax: Dynamic Parallax Barrier Autostereoscopic Display", PH.D. Dissertation, University of Illinois at Chicago, 2007, 134 pages.

Shan et al., "Principles and Evaluation of Autostereoscopic Photogrammetric Measurement", Photogrammetric Engineering and Remote Sensing, vol. 72, No. 4, Apr. 2006, pp. 365-372.

Yanagisawa et al., "A Focus Distance Controlled 3DTV", SPIE, vol. 3012, Stereoscopic Displays and Virtual Reality Systems IV, May 15, 1997, pp. 256-261.

Yanaka, "Stereoscopic Display Technique for Web3D Images", SIGGRAPH 2009, New Orleans, Louisiana, Aug. 3-7, 2009, 1 page.

* cited by examiner

REMOTE CONTROL WITH INTEGRATED POSITION, VIEWER IDENTIFICATION AND OPTICAL AND AUDIO TEST

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also a continuation-in-part of U.S. patent application Ser. No. 12/845,461, filed on Jul. 28, 2010, and entitled "Display Supporting Multiple Simultaneous 3D Views," the entirety of which is incorporated by reference herein.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/774,307, titled "Display with Elastic Light Manipulator," filed May 5, 2010;

U.S. patent application Ser. No. 12/982,069, titled "Three-Dimensional Display System with Adaptation Based on Viewing Reference of Viewer(s)," filed on same date herewith;

U.S. patent application Ser. No. 12/982,031, titled "Coordinated Driving of Adaptable Light Manipulator, Backlighting and Pixel Array in Support of Adaptable 2D and 3D Displays," filed on same date herewith;

U.S. patent application Ser. No. 12/982,020, titled "Backlighting Array Supporting Adaptable Parallax Barrier," filed on same date herewith;

U.S. patent application Ser. No. 12/982,078, titled "Multiple Remote Controllers that Each Simultaneously Controls a Different Visual Presentation of a 2D/3D Display," filed on same date herewith;

U.S. patent application Ser. No. 12/982,377, titled "3D Audio Delivery Accompanying 3D Display Supported by Viewer/Listener Position and Orientation Tracking," filed on same date herewith; and

BACKGROUND OF THE INVENTION

1. Field of the Invention

The present invention relates to remote control devices associated with audio visual systems capable of displaying three-dimensional images.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different depth resolutions, being configured for three-dimensional image viewing only, being switchable between two-dimensional image viewing and three-dimensional image viewing, and further capabilities and attributes.

BRIEF SUMMARY OF THE INVENTION

Methods, systems, and apparatuses are described for a remote control device configured to determine viewer position, perform viewer identification, and/or contribute to an audio and/or optical test, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
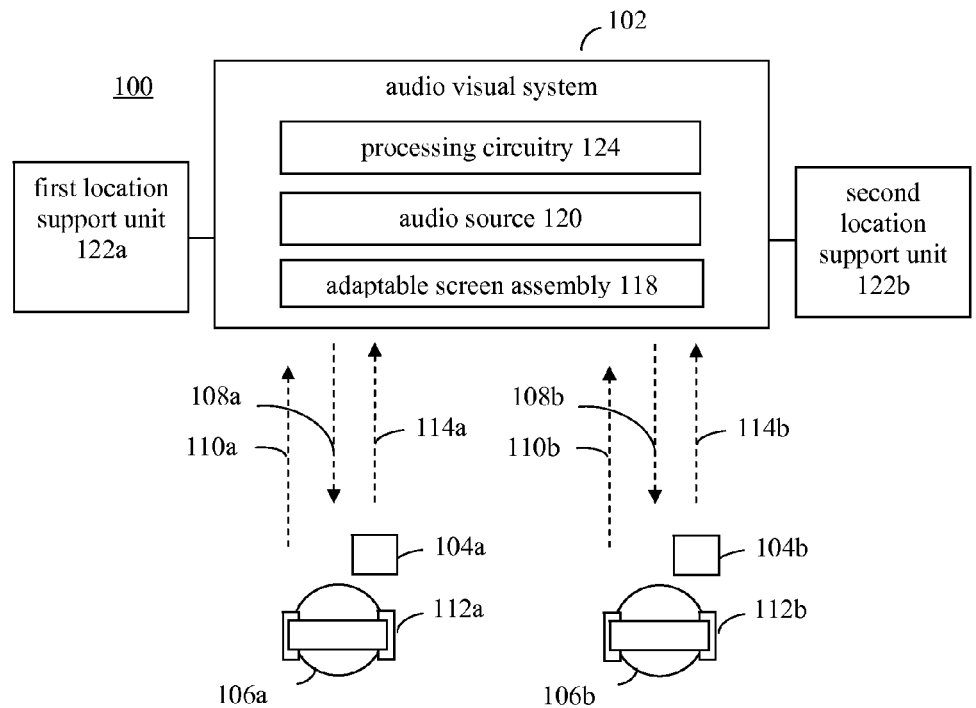
FIG. 1 shows a block diagram of an audio visual environment, according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

Embodiments of the present invention relates to remote control devices that control display devices and enable various further functions. For instance, in one embodiment, a remote control device includes elements that facilitate tracking of the position of a viewer holding the remote control relative to a display. This information may then be used by the display to optimize the delivery of 2D or 3D content to the viewer. Alternatively or additionally, the remote control device may include a sensor, such as a microphone, for gauging the quality/level of audio being played back to the viewer, and/or a camera, for gauging the quality of video being played back to the viewer. Information based on sensed audio and/or video may be fed back to the display device so that the display device can adaptively improve the manner in which audio/video content is presented. In still another embodiment, the remote control device may be capable of determining the identity of a viewer such that when the viewer handles or uses the remote control device, unique content may be made available to the viewer (or blocked, as in the case of parental controls), unique control options may be made available to the viewer, and/or unique settings relating to the presentation of audio/video may be applied.

Numerous types of display devices may display 2D and 3D content and be controlled and adapted according to a remote control device embodiment. For instance, a display device may include one or more light manipulators, such as parallax barriers and/or lenticular lenses, to deliver 3D media content in the form of images or views to the eyes of the viewers. Another type of display device may include 3D display pixel constructs (e.g., multiple layers of pixels that can be illuminated in the different layers to provide depth) that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for remote control devices and viewing environments, followed by a subsection that describes example electronic devices. It noted that the section/subsection headings provided herein are not intended to be limiting. Embodiments are described throughout this document, and any type of embodiment may be included under any section/subsection.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Remote Control Device Embodiments

In embodiments, remote control devices are provided that enable the selection of content to be displayed by a display screen, to modify attributes of the display screen displaying the selected content, including modifying attributes of adaptable display screens, to determine viewer location, and/or to enable further functions. Adaptable display screens of audio visual systems, such as those that include parallax barriers and/or other types of light manipulators, may be reconfigured based on the position of viewers, and the quality of video being delivered to the viewers, as determined at least in part by a remote control device. Furthermore, the audio being supplied by the audio visual system may be modified based on the position of viewers, and the quality of audio being delivered to the viewers, as determined at least in part by a remote control device. As such, a position of a viewer may be ascertained so that an audio visual system may be reconfigured to deliver views and audio consistent with the position of the viewer and measured characteristics of the delivered video and audio.

For instance, with regard to a parallax barrier, a spacing, number, arrangement, and/or other characteristic of slits may be adapted according to the changing viewer position and/or measured view quality. With regard to a lenticular lens, a size of the lenticular lens may be adapted (e.g., stretched, compressed) according to the changing viewer position and/or measured view quality. With regard to audio, the volume and distribution of audio broadcast by a speaker system may be modified according to the changing viewer position and/or measured view quality. In embodiments, a position of a viewer may be determined/tracked by determining a position of a remote control device associated with the viewer.

Remote control device embodiments may be used in various audio visual environments. For instance, FIG. 1 shows a block diagram of an audio visual environment 100 (also referred to as an audio visual "premises", in an embodiment), according to an exemplary embodiment. In the example of FIG. 1, first and second viewers 106a and 106b are present in audio visual environment 100, and are enabled to interact with an audio visual system 102. Audio visual system 102 includes an adaptable screen assembly 118 that delivers two-dimensional and/or three-dimensional video content, an audio source 120 that delivers audio (sound) content, and processing circuitry 124. Although two viewers 106 are shown present in FIG. 1, in other embodiments, other numbers of viewers 106 (e.g., one or more viewers 106) may be present in audio visual environment 100 that may interact with audio visual system 102 and may be delivered media content. As shown in FIG. 1, audio visual environment 100 includes audio visual system 102, a first remote control device 104a, a second remote control device 104b, a first headset 112a, a second headset 112b, a first location support unit 122a, a second location support unit 122b, and viewers 106a and 106b. First and second headsets 112a and 112b and first and second location support units ("LSUs") 122a and 122b are optional.

Viewer 106a is delivered a view 108a by adaptable screen assembly 118, and viewer 106b is delivered a view 108b by adaptable screen assembly 118. Views 108a and 108b may each be a two-dimensional view or a three dimensional view. Furthermore, in embodiments, view 108a may be delivered to viewer 106a, but not be visible by viewer 106b, and view 108b may be delivered to viewer 106b, but not be visible by viewer 106a. Audio source 120 generates audio to be broadcast to viewers 106a and 106b that corresponds to views 108a and 108b. For instance, audio source 120 may receive audio content of media content that includes video content displayed by adaptable screen assembly 118. Audio source 120 may provide audio based on the received audio content to be played at one or more loudspeakers associated with audio visual system 102 (e.g., freestanding loudspeakers, wall mounted loudspeakers, etc.) and/or by one or more earphones of headsets 112a and 112b. When audio source 120 provides audio to earphones of headsets 112a and 112b, the same or different audio may be provided to headsets 112a and 112b, depending on whether viewers 106a and 106b are watching the same or different video content.

Remote control device 104a is a device that viewer 106a may use to interact with audio visual system 102, and remote control device 104b is a device that viewer 106b may use to interact with audio visual system 102. For example, as shown in FIG. 1, viewer 106a may interact with a user interface of remote control device 104a to generate a display control signal 114a, and viewer 106b may interact with a user interface of remote control device 104b to generate a display control signal 114b. Display control signals 114a and 114b may be transmitted to adaptable screen assembly 118 using wireless or wired communication links. Display control signals 114a and 114b may be configured to select particular content desired to be viewed by viewers 106a and 106b, respectively. For example, display control signals 114a and 114b may select particular media content to be viewed (e.g., television channels, video games, DVD (digital video discs) content, video tape content, web content, etc.). Display control signals 114a and 114b may select whether such media content is desired to be viewed in two-dimensional or three-dimensional form by viewers 106a and 106b, respectively. Remote control devices 104a and 104b may be television remote control devices, game controllers, smart phones, or other remote control type device.

Headsets 112a and 112b are worn by viewers 106a and 106b, respectively. Headsets 112a and 112b each include one or two speakers (e.g., earphones) that enable viewers 106a and 106b to hear audio associated with the media content of views 108a and 108b. Headsets 112a and 112b enable viewers 106a and 106b to hear audio of their respective media content without hearing audio associated the media content of the other of viewers 106a and 106b. Headsets 112a and 112b may each optionally include a microphone to enable viewers 106a and 106b to interact with audio visual system 102 using voice commands.

Remote control device 104a may operate to provide location information 110a regarding viewer 106a to audio visual system 102, and remote control device 104b may operate to provide location information 110b regarding viewer 106b to audio visual system 102. Audio visual system 102 may use location information 110a and 110b to reconfigure one or more light manipulators (e.g., parallax barriers and/or lenticular lenses) of adaptable screen assembly 118 to enable views 108a and 108b to be delivered to viewers 106a and 106b, respectively, at various locations. Furthermore, audio visual system 102 may use location information 110a and 110b to reconfigure audio broadcast by loudspeakers associated with audio source 120. For example, audio visual system 102 and/or remote control device 104a may use positioning techniques to track the position of viewer 106a, and audio visual system 102 and/or remote control device 104b may use positioning techniques to track the position of viewer 106b.

Furthermore, remote control devices 104a and 104b may include one or more sensors used to measure characteristics of video and/or audio delivered by audio visual system 102 to viewers 106a and 106b. Based on the measured characteristics, adaptable screen assembly 118 may be reconfigured to change one or more display characteristics (e.g., characteristics of views 108a and 108b, such as brightness, contrast, resolution, number of 3D camera views, etc.) and/or audio source 120 may be reconfigured to change one or more output audio characteristics (e.g., characteristics of audio output by loudspeakers and/or earphones, such as volume, frequency response, etc.).

First and second LSUs 122a and 122b are used to aid in determining a location of viewers 106a and 106b (e.g., by aiding in determining locations of remote control devices 104a and 104b). For instance, each of first and second LSUs 122a and 122b may include one or more receivers and/or transmitters to support location determination by trilateration, triangulation, and/or by other technique. First and second LSUs 122a and 122b may be mobile or stationary (e.g., stationary LSUs or "SLSUs"). First and second LSUs 122a and 122b may be external to audio visual system 102 (e.g., in external loudspeakers or elsewhere), as shown in FIG. 1, or may included in a housing of audio visual system 102. LSUs 122a and 122b may be positioned a fair distance apart to support location determination (e.g., using 2D trilateration).

Two LSUs 122a and 122b are illustrated in FIG. 1, but in some embodiments additional LSUs 122 may be present. For instance, as shown in FIG. 1, two LSUs 122a and 122b may be present, with LSU 122a to the left of adaptable screen assembly 118, and LSU 122b to the right of adaptable screen assembly 118, with a viewing space on one side (e.g., in front) of adaptable screen assembly 118. According to trilateration, if first and second LSUs 122a and 122b are involved in a transmission exchange with a viewer positioned device (VPD) such as one of remote control devices 104a and 104b, two distances can be identified—a first distance between the VPD and first LSU 122a, and a second distance between the VPD and second LSU 122b. By processing circuitry 124 forming circles centered on first and second LSUs 122a and 122b having radii of the first and second distances, respectively, two points can be determined by processing circuitry 124 where the circles intersect define possible locations of the VPD. With two LSUs 122a and 122b present, there are two possible positions of the VPD: a first position in front of adaptable screen assembly 118 and second position in back of adaptable screen assembly 118 (which is behind a wall, if adaptable screen assembly 118 is against a wall, and can be discarded). By translating this distance and left/right location to both adaptable screen assembly 118 and the viewer's eye location, a reasonable estimate of a left/right location from center-screen and distance between center-screen and a left and right viewer eyes can be generated by processing circuitry 124.

One or more additional LSUs 122a and 122b may be present to increase an accuracy of the determined viewer position and/or to add three dimensions to the determined viewer position. However, in most embodiments, a viewer's eyes may be above, at, or below center-screen. Instead, to service a normal head orientation, we do care about left/right location (which is why our light manipulators are vertically aligned by the way) and thus only two SLS units involved in 2D trilateration for example may prove sufficient.

In embodiments, LSUs 122a and 122b (and optionally further LSUs 122) may support determining the location of viewers having VPDs, such as remote control devices 104. For instance, in one embodiment, a VPD may be transmitting signals only, and LSUs 122a and 122b may be receiving only (receiving the transmitted signals), and a location determination of the VPD may be made by processing circuitry 124 based on the received signals. In another embodiment, LSUs 122a and 122b may be transmitting signals only, and a VPD may be receiving only (receiving the transmitted signals), and a location determination of the VPD may be made by processing circuitry of the VPD or by processing circuitry 124 based on the received signals.

In another embodiment, LSUs 122a and 122b may transmit signals first, and a VPD may receive the transmitted signals and respond by transmitting a time marker (e.g., when accurate time sync between SLSU's and VPD exists), and a location determination of the VPD may be made by LSUs 122a and 122b and/or processing circuitry 124 by recording a total round trip communication time, and subtracting therefrom a local turnaround time via time marker information and clocking information of the VPD (which is potentially unsynchronized). Alternatively, a VPD may transmit signals first, and LSUs 122a and 122b may receive the transmitted signals and respond by transmitting a time marker (e.g., when accurate time sync between SLSU's and VPD exists), and a location determination of the VPD may be made by processing circuitry of the VPD and/or by LSUs 122a and 122b and/or processing circuitry 124 by recording a total round trip communication time, and subtracting therefrom a local turnaround time via time marker information and clocking information of the VPD.

In further embodiments, underlying communication circuitry of a VPD and/or LSUs 122a and 122b may support the location determination using normal, unrelated communications. According to any of the above techniques, LSUs 122a and 122b (and/or/processing circuitry 124) may coordinate timing there amongst. In any of the above techniques, the actual calculations based on gathered information can be performed anywhere (e.g., in whole or in part in the VPD, one or more LSUs 122, and/or processing circuitry 124).

It is noted that remote control devices 104a and 104b and headsets 112a and 112b are exemplary VPD's that can either or both participate in location processing as generally set forth above. Such VPD's may include location support circuitry (not shown in FIG. 1), which may include processing circuitry, sensors, receivers, transmitters, etc., that at least assist in location determinations, testing, and reconfiguration of audio and video output.

Audio visual system 102 can be packaged within one or more housings such as set top boxes, media players (e.g., digital video disc players, etc.), personal computers, televisions, monitors, phones, etc. LSU 122 may be included in one or more housings separate from audio visual system 102 that coordinate (wired or wirelessly) with processing circuitry 124 to support the location processing.

In embodiments, adaptable screen assembly 118 may be reconfigured based on resulting location information and audio signaling by audio source 120 may be reconfigured (e.g., reconfiguring delays and signal amplitudes) via the various built-in and/or separately housed speakers.

Figure 2:
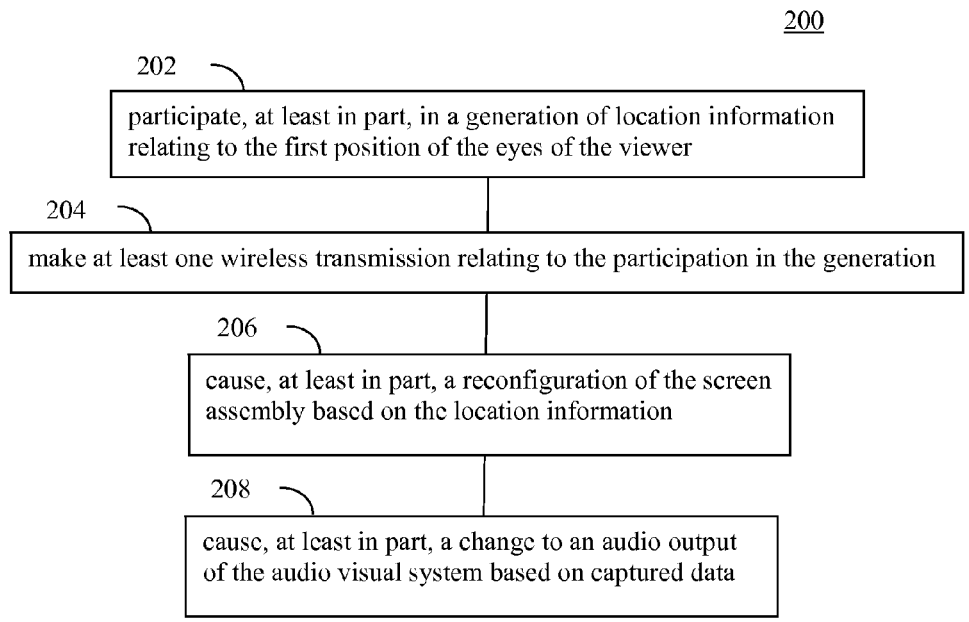
FIG. 2 shows a flowchart providing a process for a remote control device to support interaction by a viewer with a screen assembly of a display device, according to an exemplary embodiment.

For instance, FIG. 2 shows a flowchart 200 providing a process for a remote control device to support interaction by a viewer with a screen assembly of a display device, according to an exemplary embodiment. For instance, in FIG. 1, remote control device 104a may perform flowchart 200 (with regard to viewer 106a) and/or remote control device 104b may perform flowchart 200 (with regard to viewer 106b). Further structural and operational embodiments will be apparent to persons skilled in the relevant art(s) based on the discussion regarding flowchart 200. Flowchart 200 is described as follows.

Flowchart 200 begins with step 202. In step 202, generation of location information relating to the first position of the eyes of the viewer is at least in part participated by the remote control device. For example, with reference to FIG. 1, remote control device 104a may participate in generating location information relating to the position of the eyes of viewer 106a. In an embodiment, the location information may be generated in remote control device 104a. Alternatively, remote control device 104a may generate information that may be transmitted to audio visual system 102 to be used to generate the location information. Similarly, remote control device 104b may participate in generating location information relating to the position of the eyes of viewer 106b. Exemplary embodiments for remote control devices participating in generating location information are described further below.

Figure 3:
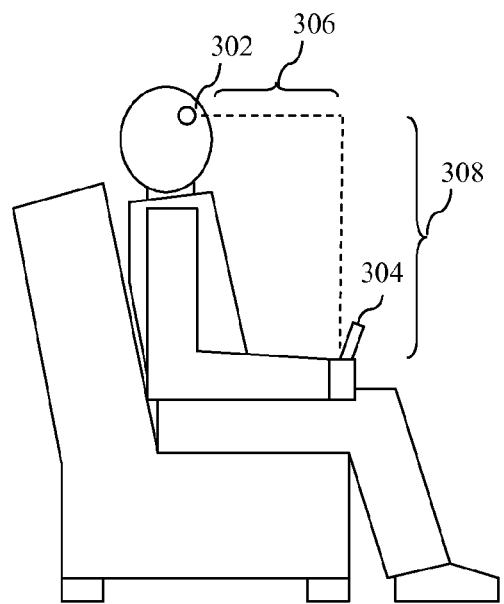
FIGS. 3 and 4 show diagrams of a viewer using a remote control that is configured to generate location information, according to exemplary embodiments.
Figure 4:
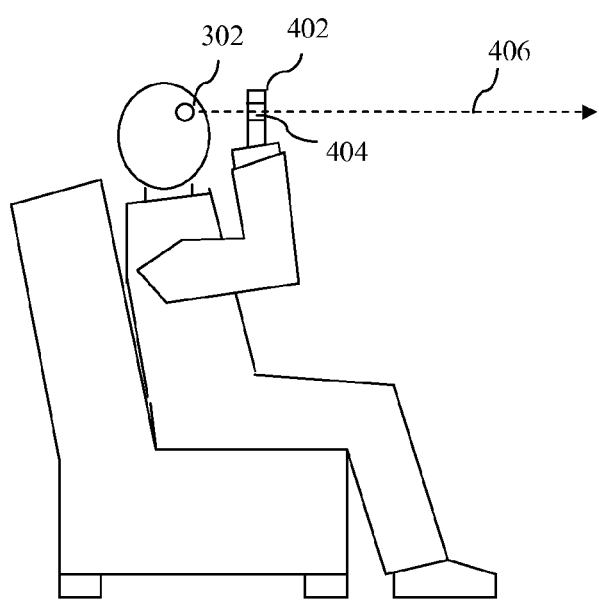

Note that in embodiments, a remote control device, such as one of remote control devices 104a and 104b, may be positioned in one or more locations when participating in generating location information relating to the position of the eyes of a viewer. For example, FIGS. 3 and 4 show diagrams of a viewer using remote control devices that are configured to generate location information, according to exemplary embodiments. In each of FIGS. 3 and 4, the viewer is seated in a chair facing a display screen (not visible in FIGS. 3 and 4). In FIG. 3, the viewer holds a remote control device 304 in the viewer's right hand, which is resting on an arm of the chair. In this position, a position of remote control device 304 may be determined at least in part by operation of remote control device 304 (e.g., according to the embodiments described further below). Furthermore, based on the determined location of remote control device 304, a location of eyes 302 of viewer 302 may be estimated. For instance, an average distance and an angle between eyes of a viewer and a hand holding remote control device 304 may be predetermined (e.g., for an average sized person). For example, as shown in FIG. 3, on average, remote control device 304 may be held a horizontal distance 306 (e.g., x-axis, perpendicular to display screen), a vertical distance 308 (e.g., y-axis), and a lateral distance (e.g., z-axis, perpendicular to the x- and y-axes, not visible in FIG. 3), from a viewer's eyes. This distance and angle may be determined and applied as an offset to the determined position of remote control device 304 to estimate a location of the eyes of the viewer.

Alternatively, the remote control device may be held adjacent to the eyes of the viewer, and the position of the remote control device may be determined to determine the location of the eyes of the viewer. For instance, as shown in FIG. 4, the viewer holds a remote control device 402 adjacent to eyes 302 of the viewer. In the example of FIG. 4, remote control device 402 includes one or two eyepieces 404. The viewer holds remote control device 402 adjacent to eyes 402, looks through the one or two eyepieces 404 in a direction 406 of the display screen, and in this arrangement, the position of remote control device 402 may be determined (e.g., by manually or automatically activating a location determining algorithm) to determine the location of the eyes 302 of the viewer. In this manner, the location of eyes 302 of the viewer may be more accurately determined, because remote control device 402 is held adjacent to eyes 302 when the position of remote control device 402 is determined.

Referring back to flowchart 200 in FIG. 2, in step 204, at least one wireless transmission relating to the participation in the generation is made. For example, referring to FIG. 1, if the location information is generated in remote control device 104a, remote control device 104a may transmit location information 110a to audio visual system 102. Alternatively, remote control device 104a may transmit generated information to audio visual system 102 to be used to generate the location information. Remote control device 104b may operate in a similar manner.

In step 206, a reconfiguration of the screen assembly is caused, at least in part, based on the location information. For instance, as shown in FIG. 1, audio visual system 102 may receive location information 110a and/or optical test information. Alternatively, audio visual system 102 may receive captured information from remote control device 104a, and may generate the location information based on the received information. In either case, audio visual system 102 may generate control signals to reconfigure adaptable screen assembly 118 based on the location information and/or optical test information. For instance, the control signals may reconfigure one or more of a brightness, resolution, color scheme, a number of 3D camera views, a particular set of 3D camera views that are displayed, and/or other attributes of adaptable screen assembly 118. In embodiments, when adaptable screen assembly 118 includes one or more parallax barriers, example features that may be reconfigured include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, when adaptable screen assembly 118 includes a lenticular lens, a width of the lenticular lens may be reconfigured to modify delivered images. When adaptable screen assembly 118 includes a backlighting array, a brightness of the backlighting array may be reconfigured. When adaptable screen assembly 118 includes a pixel array, the pixel array may be reconfigured by changing a color scheme of the pixel array, changing a resolution of the pixel array, changing a number and/or distribution of views provided by the pixel array, etc.

In step 208, a change to an audio output of the audio visual system is caused at least in part based on captured data. For instance, in an embodiment, based on the location information and/or audio test data captured at remote control device 104a, an audio output of audio visual system 102 may be changes. For instance, audio source 120 may modify one or more loudspeaker drive signals to change one or more of a volume, pitch, phase, frequency and/or other output audio characteristic of the loudspeakers associated with audio visual system 102.

Example implementations of remote control devices, including multiple remote control devices used to control aspects of a three-dimensional display device, are provided in U.S. patent application Ser. No. 12/982,078, titled "Multiple Remote Controllers that Each Simultaneously Controls a Different Visual Presentation of a 2D/3D Display," filed on same date herewith, and incorporated by reference in its entirety. Example implementations of the delivery of audio in a three-dimensional display environment are described in U.S. patent application Ser. No. 12/982,377, titled "3D Audio Delivery Accompanying 3D Display Supported by Viewer/Listener Position and Orientation Tracking," filed on same date herewith, which is incorporated by reference herein in its entirety.

Figure 5:
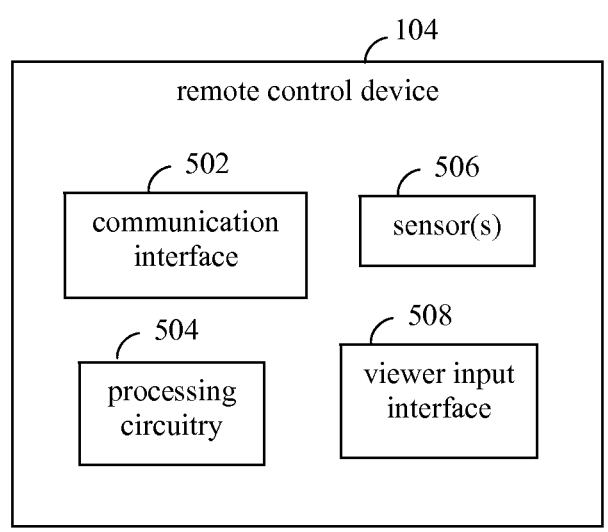
FIG. 5 shows a block diagram of a remote control device, according to an exemplary embodiment.

Remote control devices 104, including remote control devices 304 and 402, may be configured in various ways to enable interaction with audio visual system 102 and to enable the position of the eyes of viewers 106a and 106b, respectively, to be determined For instance, FIG. 5 shows a block diagram of a remote control device 104, according to an exemplary embodiment. As shown in FIG. 5, remote control device 104 may include a communication interface 502, a processing circuitry 504, one or more sensor(s) 506, and a viewer input interface 508. Remote control device 104 may include one or more of these elements shown in FIG. 5, depending on the particular embodiment. These elements of remote control device 104 are described as follows.

Processing circuitry 504 may be included in remote control device 104 to perform processing operations for remote control device 104, including determining a position of remote control device 104 according to a positioning technique (e.g., triangulation or trilateration, or other positioning technique). For instance, remote control device 104 may include one or more receivers that receive satellite broadcast signals (e.g., a global positioning system (GPS) module that receives signals from GPS satellites). Processing circuitry 504 may calculate the position of remote control device 104 by precisely timing the received signals according to GPS techniques. In another embodiment, remote control device 104 may include one or more receivers that receive signals transmitted by display device 102 that are used by processing circuitry 504 to calculate the position of remote control device 104. In other embodiments, processing circuitry 504 may implement other types of positioning techniques. By determining a position of remote control device 104, a position of the associated viewer 106 may be estimated, including ascertaining a location of the eyes of the viewer (e.g., as described above with respect to FIGS. 3 and 4).

Viewer input interface 508 may be present to enable viewer 106 to interact with remote control device 104. For example, viewer input interface 508 may include any number and combination of user interface elements, such as a keyboard, a thumb wheel, a pointing device, a roller ball, a stick pointer, a joystick, a thumb pad, a display, a touch sensitive display, a graphical user interface (GUI), any number of virtual interface elements, a voice recognition system, a haptic interface, and/or other user interface elements described elsewhere herein or otherwise known. Viewer input interface 508 may enable the corresponding viewer to select media content to be delivered by an audio visual system, including the selecting of a television channel, a video game, DVD (digital video discs) content, video tape content, web content, etc. Viewer input interface 508 may further be configured to enable the viewer to manually enter position information for the viewer into remote control device 104, including manually entering coordinates of viewer 106 in audio visual environment 100 of FIG. 1, entering an indication of a predetermined location in audio visual environment 100 into remote control device 104 (e.g., a "location A", a "seat D," etc.), or providing position information in any other manner.

Sensor(s) 506 may be present in remote control device 104 to enable position detection of the corresponding viewer 106, and to enable an optical test of the video displayed by the audio visual system. For example, sensor(s) 506 may include one or more sensor components, such as cameras, microphones, infrared sensors, etc. For instance, sensor(s) 506 may include one or more cameras that may be pointed by the corresponding viewer 106 at display device 102, which may display a symbol or code, and one or more images of the displayed symbol or code may be captured by sensor(s) 506. Processing circuitry 504 may receive the captured image(s), and determine a position of remote control device 104 relative to display device 102 based on the captured image(s). For example, in an embodiment, sensor(s) 506 may include a pair of cameras, and processing circuitry 504 may perform dual image processing to determine the position of remote control device 104 relative to display device 102. Furthermore, the captured image information may be processed by processing circuitry 504 to generate optical test information. The optical test information may be used to generate control signals to reconfigure adaptable screen assembly 118 (FIG. 1) to change one or more display characteristics.

Furthermore, sensor(s) 506 may include one or more microphones or other audio sensors. The microphone(s) may be used to enable a test of the audio broadcast by the audio visual system. For instance, processing circuitry 504 may process the audio captured by the microphones to generate audio test information to be transmitted to the audio visual system to cause adjustment of the audio provided by audio source 120 (FIG. 1) to change one or more broadcast audio characteristics.

Communication interface 502 is configured to transmit location information 110, optical test information, audio test information, and/or selected media content information to display device 102 from remote control device 104. Location information 110 may include a determined position for remote control device 104 (e.g., calculated by processing circuitry 504 or processing circuitry 504), and/or may include captured data (e.g., received signal data received by processing circuitry 504, images captured by sensor(s) 506, etc.) so that display device 102 may determine the position of remote control device 104 based on the captured data.

Note that the example of remote control device 104 shown in FIG. 5 is provided for purposes of illustration, and that remote control device embodiments may be configured in further ways, including further and/or alternative elements and functions. The following subsection described further remote control device embodiments, exemplary embodiments for determining viewer location information, and exemplary embodiments for optical and audio test.

B. Example Viewer Location Determining and Audio/Visual Test Embodiments

Figure 6:
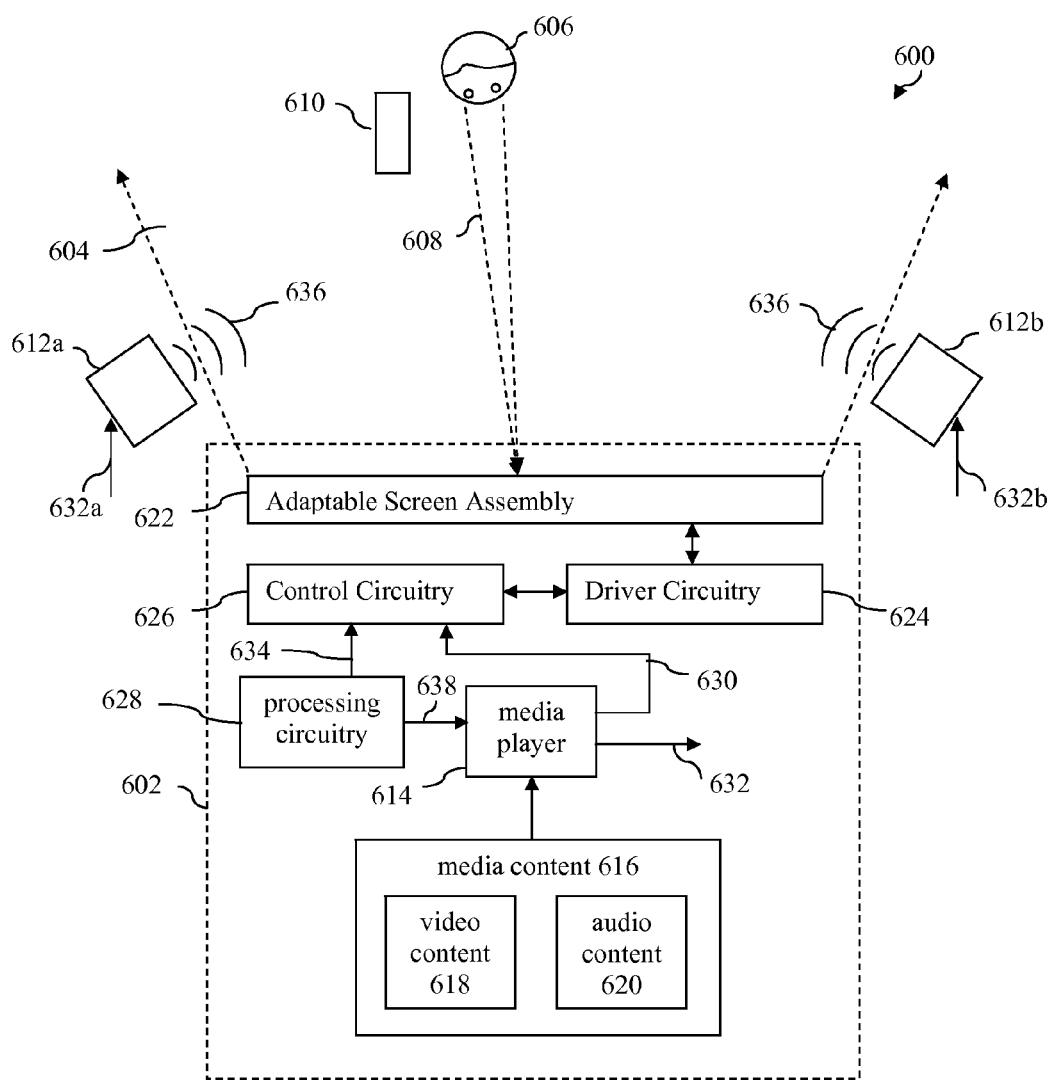
FIG. 6 is a block diagram of an operating environment that may benefit from features provided by embodiments described herein.

Audio visual environment 100 of FIG. 1 may be configured in various ways, in embodiments. For instance, FIG. 6 shows a block diagram of an example operating environment 600 that can benefit from embodiments of the present invention. As shown in FIG. 6, example operating environment 600 includes an audio visual system 602, a remote control device 610 (held and/or used by a viewer 606), and one or more loudspeakers 612 (e.g., loudspeakers 612a and 612b). Audio visual system 602 includes a media player 614, an adaptable screen assembly 622, driver circuitry 624, control circuitry 626, and processing circuitry 628. Generally speaking, audio visual system 602 operates to deliver light 604 from adaptable screen assembly 622 that includes one or more viewable images to a viewing area that includes a first viewer 606. Furthermore, audio visual system 602 operates to deliver audio 636 (e.g., sound) associated with the viewable images delivered in light 604 from loudspeaker(s) 612. Loudspeakers 612 may be separate from audio visual system 602 as shown in FIG. 6 (e.g., as earphones for viewer 606, freestanding loudspeakers, wall mounted loudspeakers, etc.), or may be integrated in audio visual system 602 (e.g., speakers integrated in a handheld device, integrated in a display device such as a television, etc.).

Audio visual system 602 may be implemented in one or more devices. For example, in one embodiment, adaptable screen assembly 622, control circuitry 626, driver circuitry 624, processing circuitry 628, and media player 614 may be implemented in a common device that may be accessed by a viewer 606, such as a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, some types of televisions, etc. In another embodiment, adaptable screen assembly 622 may be implemented in a device that is separate from media player 614. For instance, media player 614 may be a home theater system receiver, a set-top box, a computer, a game console, or other such device, and adaptable screen assembly 622 may be in a display device that is coupled to media player 614 in a wired or wireless fashion. In such case, driver circuitry 624, control circuitry 626, and processing circuitry 628 may each be included in the display device or in the device that include media player 614.

As shown in FIG. 6, media player 614 receives media content 616, which includes video content 618 and audio content 620. Media player 614 is configured to provide video content 618 to control circuitry 626 in the form of a video content stream 630. Control circuitry 626 provides control signals to driver circuitry 624 based on video content stream 630, and driver circuitry 624 generates drive signals that cause the images/video of video content stream 630 to be displayed by adaptable screen assembly 622. Furthermore, media player 614 is configured to provide audio content 620 to loudspeakers 612 in the form of speaker drive signals 632. For instance, in the example of FIG. 6, speaker drive signals 632 includes first and second speaker drive signals 632a and 632b received by loudspeakers 612a and 612b, respectively. Loudspeakers 612 broadcast audio/sound based on speaker drive signals 632.

Media player 614 may include any suitable type of media player, including a media player that is configured to load and/or read media content 616 in the form of a content file, a media player that is configured to receive a media stream (e.g., from a network, such as a local area network (LAN), wide area network (WAN), or combination of networks, such as the Internet), a optical media player (e.g., a DVD (digital video disc) player), a video game player (e.g., of a video game console), etc. Media content 616 may have any form, including the form of data stored on an optical media (e.g., a DVD), a stored media file or streamed media (e.g., compressed media content that is compressed according to a video compression standard such as MPEG-1, MPEG-2, MPEG-4, H.261, H.262, H.263, H.264, etc.), or other form.

Video content 618 may include 2D content (e.g., a frame sequence providing a single view perspective), and/or may include 3D content. For example, with regard to 3D content, video content 618 may include one or more pairs of frame sequences providing pairs of view perspectives that may be perceived by viewers as corresponding 3D views. If video content 618 includes frame sequences corresponding to two or more pairs of perspective views, the two or more pairs of perspective views may be displayed by adaptable screen assembly 612 to be perceived as a multiview 3D. For example, video content 618 may include "3Dx" or "3D-x" content having a number of "x" camera views (of corresponding perspective views), such as "3D-4," having four camera views, "3D-16," having sixteen camera views, etc. The pairs of camera views in addition to a first pair of camera views enable viewers to "view behind" the displayed 3D content corresponding to the first pair of camera view by moving their heads left-right while watching the display screen. idiot In 3D-4, in a first position, a viewer may be delivered a first 3D view with a first pair of camera views (e.g., first left and right perspective views). When the viewer moves their head left or right to a second position, the viewer may be delivered a second 3D view with a second pair of camera views (e.g., second left and right perspective views) that is slightly different from the first 3D view, enabling the viewer to have the illusion of viewing slightly behind the objects displayed in the first 3D view. If the content has more camera views than 3D-4, the viewer may be enabled to view even further behind displayed objects by moving their head further left or right to further positions to be delivered further 3D views. Each pair of camera views (e.g., right and left perspective view pairs) may be represented by corresponding right and left frame sequences.

In embodiments, any number of loudspeakers 612 may be present to enable media player 614 to play audio content 620 according to any surround sound system type, including any number of different number of channels (e.g., 3.0 system, 4.0 systems, 5.1 systems, 6.1 systems, etc., where the number prior to the decimal point indicates the number of non-subwoofer loudspeakers present, and the number following the decimal point indicates whether a subwoofer loudspeaker is present), etc.

Adaptable screen assembly 622 is designed such that display characteristics associated therewith can be modified to support different viewing modes. For example, certain display characteristics associated with adaptable screen assembly 622 may be modified to selectively present images in a two-dimensional viewing mode or one or more three-dimensional viewing modes. For example, in embodiments, display characteristics associated with screen assembly 622 may be modified to display a single image of certain subject matter to provide a two-dimensional view thereof, to display two images of the same subject matter viewed from different perspectives in a manner that provides a single three-dimensional view thereof, or to display a multiple of two images (e.g., four images, eight images, etc.) of the same subject matter viewed from different perspectives in a manner that simultaneously provides multiple three-dimensional views thereof, wherein the particular three-dimensional view perceived by a viewer is dependent at least in part upon the position of the viewer (also referred to herein as a "multi-view three-dimensional viewing mode").

Various examples of adaptable screen assemblies that can be modified to support such two-dimensional and three-dimensional viewing modes are described in the following commonly-owned, co-pending U.S. Patent Applications: U.S. patent application Ser. No. 12/774,307, filed on May 5, 2010 and entitled "Display with Elastic Light Manipulator"; U.S. patent application Ser. No. 12/845,409, filed on Jul. 28, 2010 and entitled "Display with Adaptable Parallax Barrier"; and U.S. patent application Ser. No. 12/845,461, filed on Jul. 28, 2010 and entitled "Display Supporting Multiple Simultaneous 3D Views." The entirety of each of these applications is incorporated by reference herein. Adaptable screen assembly 622 may be implemented in accordance with descriptions provided in the above-referenced applications.

In addition to the foregoing capabilities, adaptable screen assembly 622 may also be capable of simultaneously presenting two dimensional views and three-dimensional views in different regions of the same screen, respectively. By way of example, adaptable screen assembly 622 may be capable of simultaneously presenting a two-dimensional view of first content in a first region of a screen, and one or more three-dimensional views of second content in a second region of the screen. Adaptable screen assemblies having such capabilities are described in commonly-owned, co-pending U.S. patent application Ser. No. 12/845,440, filed on Jul. 28, 2010, and entitled "Adaptable Parallax Barrier Supporting Mixed 2D and Stereoscopic 3D Display Regions," the entirety of which is incorporated by reference herein. Furthermore, adaptable screen assembly 622 may simultaneously deliver different two-dimensional and/or three-dimensional views to different viewers, such that each viewer is delivered their own view that is not visible to others of the viewers. Adaptable screen assemblies having such capabilities are described in commonly-owned, co-pending U.S. patent application Ser. No. 12/845,461, filed on Jul. 28, 2010 and entitled "Display Supporting Multiple Simultaneous 3D Views."

A display characteristic of adaptable screen assembly 622 that may be modified to switch between different full-screen and regional two-dimensional and three-dimensional viewing modes may include a configuration of an adaptable light manipulator such as an adaptable parallax barrier. An adaptable lenticular lens may also be used as an adaptable light manipulator to switch between different full-screen three-dimensional viewing modes. Descriptions of such adaptable light manipulators and methods for dynamically modifying the same may be found in the aforementioned, incorporated U.S. patent application Ser. No. 12/774,307, filed on May 5, 2010 and entitled "Display with Elastic Light Manipulator" and U.S. patent application Ser. No. 12/845,409, filed on Jul. 28, 2010 and entitled "Display with Adaptable Parallax Barrier." For example, the degree of stretching of an adaptable lenticular lens may be modified in order to support certain three-dimensional viewing modes. As another example, barrier elements of an adaptable parallax barrier may be selectively placed in a blocking or non-blocking state in order to support certain full-screen and regional two-dimensional and three-dimensional viewing modes.

Another display characteristic of adaptable screen assembly 622 that may be modified to switch between different full-screen and regional two-dimensional and three-dimensional viewing modes may include the manner in which image content is mapped to display pixels of a pixel array, as described in commonly-owned, co-pending U.S. patent application Ser. No. 12/774,225, filed on May 5, 2010 and entitled "Controlling a Pixel Array to Support an Adaptable Light Manipulator," the entirety of which is incorporated by reference herein. Yet another display characteristic that may be modified to achieve such switching includes the manner in which backlighting is generated by a backlighting array or other non-uniform light generation element, as described in commonly-owned, co-pending U.S. patent application Ser. No. 12/982,020, filed on even date herewith and entitled "Backlighting Array Supporting Adaptable Parallax Barrier," the entirety of which is incorporated by reference herein.

The adaptation of the display characteristics of adaptable screen assembly 622 is carried out by sending coordinated drive signals to various elements (e.g., a non-uniform backlight generator, a pixel array and an adaptable light manipulator) that comprise adaptable screen assembly 622. This function is performed by driver circuitry 624 responsive to the receipt of control signals from control circuitry 626. A manner in which such coordinated drive signals may be generated is described in U.S. patent application Ser. No. 12/982,031, filed on even date herewith and entitled "Coordinated Driving of Adaptable Light Manipulator, Backlighting and Pixel Array in Support of Adaptable 2D and 3D Displays," which is incorporated herein in its entirety.

As also discussed in the foregoing incorporated U.S. patent applications, display characteristics associated with an adaptable screen assembly, such as adaptable screen assembly 622, may be modified in order to present three-dimensional content to a viewer at a particular location and/or having a particular head orientation. For three-dimensional viewing systems that use light manipulators such as a parallax barrier or a lenticular lens, the viewer must be positioned in a well-defined location (a "sweet spot") in order to properly experience the three-dimensional effect. Certain display characteristics of adaptable screen assembly 622, such as the configuration of an adaptable light manipulator and/or the manner in which images are mapped to display pixels in a pixel array, can advantageously be modified in order to deliver a particular three-dimensional view to a viewer at a particular location. Such display characteristics may also be modified to deliver content to a viewer in a manner that corresponds to a current head orientation of the viewer (e.g. if the viewer's head is tilted at an angle, the content may be displayed at a similar angle). Additional display characteristics that may be modified in order to deliver a three-dimensional view to a viewer at a particular location include a distance and angular alignment between an adaptable light manipulator and a pixel array that together comprise adaptable screen assembly 622.

Thus, for example, with continued reference to FIG. 6, viewer 606 may have a first viewing reference 608 with respect to adaptable screen assembly 622. First viewing reference 608 may comprise any of a number of aspects that affect how three-dimensional content displayed via adaptable screen assembly 622 will be perceived by viewer 606. Such aspects may include, for example and without limitation, a position or location of first viewer 606 relative to adaptable screen assembly 622, a head orientation of first viewer 606 and a point of gaze of first viewer 606. The position or location of first viewer 606 relative to adaptable screen assembly 622 may include a distance from adaptable screen assembly 622 or some reference point associated therewith, and such distance may include both horizontal distance and elevation. The position or location of first viewer 606 may also include eye locations of first viewer 606. The head orientation of first viewer 606 may include both a degree of tilt and rotation of the head of first viewer 606.

As discussed above, audio visual system 602 is capable of modifying one or more adaptable display characteristics of adaptable screen assembly 622 to deliver a particular three-dimensional view to a particular location and/or to deliver a view having a particular orientation. Thus, audio visual system 602 could benefit from being able to determine one or more aspects of first viewing reference 608 associated with first viewer 606 in order to deliver three-dimensional content to first viewer 606 in an optimized manner. Embodiments described herein enable control circuitry 626 of audio visual system 602 to receive information concerning one or more aspects of first viewing reference 608 and to use such information to cause a modification of at least one of the display characteristics of adaptable screen assembly 622 to cause three-dimensional content to be presented to first viewer 606 in an optimized manner. This modification may be caused by causing appropriate drive signals to be generated by driver circuitry 624, as described above.

Remote control device 610 is an example of remote control devices 104 described above. For instance, in embodiments, remote control device 610 may include one or more of communication interface 502, processing circuitry 504, sensor(s) 506, and viewer input interface 508 shown in FIG. 5. Remote control device 610 may generate location information, optical test information, audio test information, and/or selected media content information, which may be processed by processing circuitry 504, and/or may be transmitted to audio visual system 602 by communication interface 502. The received information may be processed by processing circuitry 628 to generate one or more optical modification instructions 634 and/or one or more audio modification instructions 638. Alternatively, the received information from remote control device 610 may have the form of optical modification instructions 634 and/or audio modification instructions 638. Optical modification instructions 634 produced by processing circuitry 628 or received from remote control device 610 may be provided to control circuitry 626. Based on instructions 634, control circuitry 626 causes modification of at least one of the display characteristics of adaptable screen assembly 622. This modification may be caused by causing appropriate drive signals to be generated by driver circuitry 624. Such modification may be performed, for example, to deliver a particular three-dimensional view to viewer 606 in accordance with one or more aspects of viewing reference 608. For example, such modification may be performed to deliver a particular three-dimensional view to an estimated location of viewer 606 (including an eye location of viewer 606) and/or in an orientation that corresponds to an orientation of viewer 606. Thus, by producing and providing such location information to control circuitry 626, audio visual system 602 is capable of delivering three-dimensional content to viewer 606 in an optimized manner.

Furthermore, audio modification instructions 638 produced by processing circuitry 628 or received from remote control device 610 may be provided to media player 614. Based on instructions 638, media player 614 causes modification of at least one of the audio characteristics of audio 636 broadcast from loudspeakers 612. For instance, media player 614 may modify speaker drive signals 632 (e.g., speaker drive signals 632a and 632b) to change a volume and/or a frequency range (e.g., an equalization function) of sound from either or both of loudspeakers 612a and 612b, and/or to change a distribution of sound (via modification of volume, phase, frequency, etc.) broadcast from loudspeakers 612a and 612b to improve a quality of surround sound at the determined location of viewer 606 (e.g., the determined location of the eyes of viewer 606).

Various embodiments of audio visual system 602 will now be described in reference to FIGS. 7-12. Each of these embodiments utilizes different implementations of processing circuitry 504 and/or processing circuitry 628 to produce location information, optical test information, and/or audio test information, which may be used to reconfigure adaptable screen assembly and/or output audio. For instance, flowchart 200 may be performed according to each of the embodiments of FIGS. 7-12. These different embodiments are described herein by way of example only and are not intended to be limiting.

Figure 7:
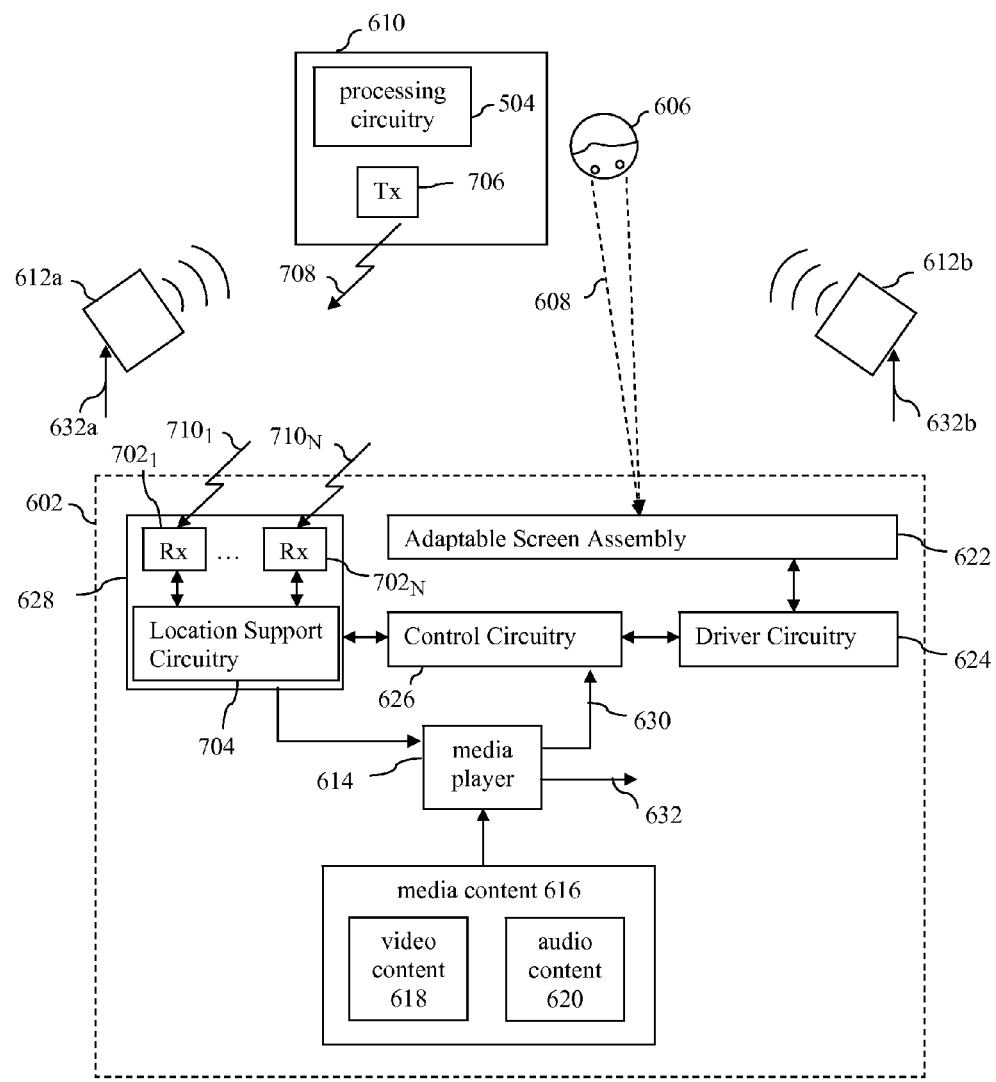
FIG. 7 is a block diagram of an audio visual system in accordance with an embodiment that includes location processing circuitry that implements a triangulation technique to determine an estimated location of a viewer.

For example, FIG. 7 is a block diagram of an embodiment of an audio visual environment in which processing circuitry 504 and processing circuitry 628 jointly implement a triangulation technique to determine an estimated location of viewer 606 relative to adaptable screen assembly 622. In FIG. 7, in accordance with this embodiment, remote control device 610 is shown including processing circuitry 504 and a transmitter 706. Transmitter 706 is an example of communication interface 502 of FIG. 5. Processing circuitry 504 instructs transmitter 706 to transmit a location tracking signal 708. Location tracking signal 708 may comprise, for example, a radio frequency (RF) signal or other wireless signal. As shown in FIG. 7, processing circuitry 628 of audio visual system 602 includes a plurality of receivers $702_1$-$702_N$ and location support circuitry 704 coupled thereto. Receivers $702_1$-$702_N$ are operable to receive corresponding versions $710_1$-$710_N$ of location tracking signal 708. Location support circuitry 704 is operable to determine an estimated location of viewer 606 based on characteristics of the received versions $710_1$-$710_N$ of location tracking signal 708. For example, location support circuitry 704 may determine the estimated location of viewer 606 according to triangulation or trilateration techniques, such as by measuring relative time delays between the received versions $710_1$-$710_N$ of location tracking signal 708, although this is only an example. The estimated location of viewer 606 is then provided by location support circuitry 704 to control circuitry 626 and/or media player 632 as part of the above-described location information.

Transmitter 706 is operable to transmit location tracking signal 708 on an on-going basis. For example, transmitter 706 may be configured to automatically transmit location tracking signal 708 on a periodic or continuous basis. Alternatively, transmitter 706 may intermittently transmit location tracking signal 708 responsive to certain activities of viewer 606 or other events. Location support circuitry 704 is operable to calculate an updated estimate of the location of viewer 606 based on the corresponding versions $710_1$-$710_N$ of location tracking signal 708 received over time. Because processing circuitry 504 comprises viewer-located circuitry, as viewer 606 moves around the viewing area in front of adaptable screen assembly 622, location support circuitry 704 is able to produce updated estimates of the location of viewer 606 and provide such updated estimates to control circuitry 626 and/or media player 614. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606.

As will be understood by persons skilled in the relevant art(s), to perform the triangulation function accurately, certain positioning of and/or spacing between receivers $702_1$-$702_N$ may be required. Depending upon the implementation, each of the receivers $702_1$-$702_N$ may be included at fixed spatially-dispersed locations within a single housing and the housing may be placed in a particular location to achieve satisfactory or optimal results. Alternatively, separate housings may be used to contain different ones of receivers $702_1$-$702_N$ and may be placed at different locations in or around the viewing area to achieve satisfactory or optimal results (e.g., in LSUs 122a and 122b of FIG. 1, etc.). Transmitter 706 may transmit any suitable type and/or frequency signal for location tracking signals 708. For instance, in one embodiment, location tracking signals 708 may be UWB (ultra wide band) signals (UWB has demonstrated "location" performance within buildings where other transmission approaches have had difficulty) or other frequency/type signals. Furthermore, transmitter 706 and receivers 702 may optionally also be used for other types of transmissions unrelated to location determination, such as for transmitting of content related information (e.g., program guides, phone calls, texting, etc.).

Figure 8:
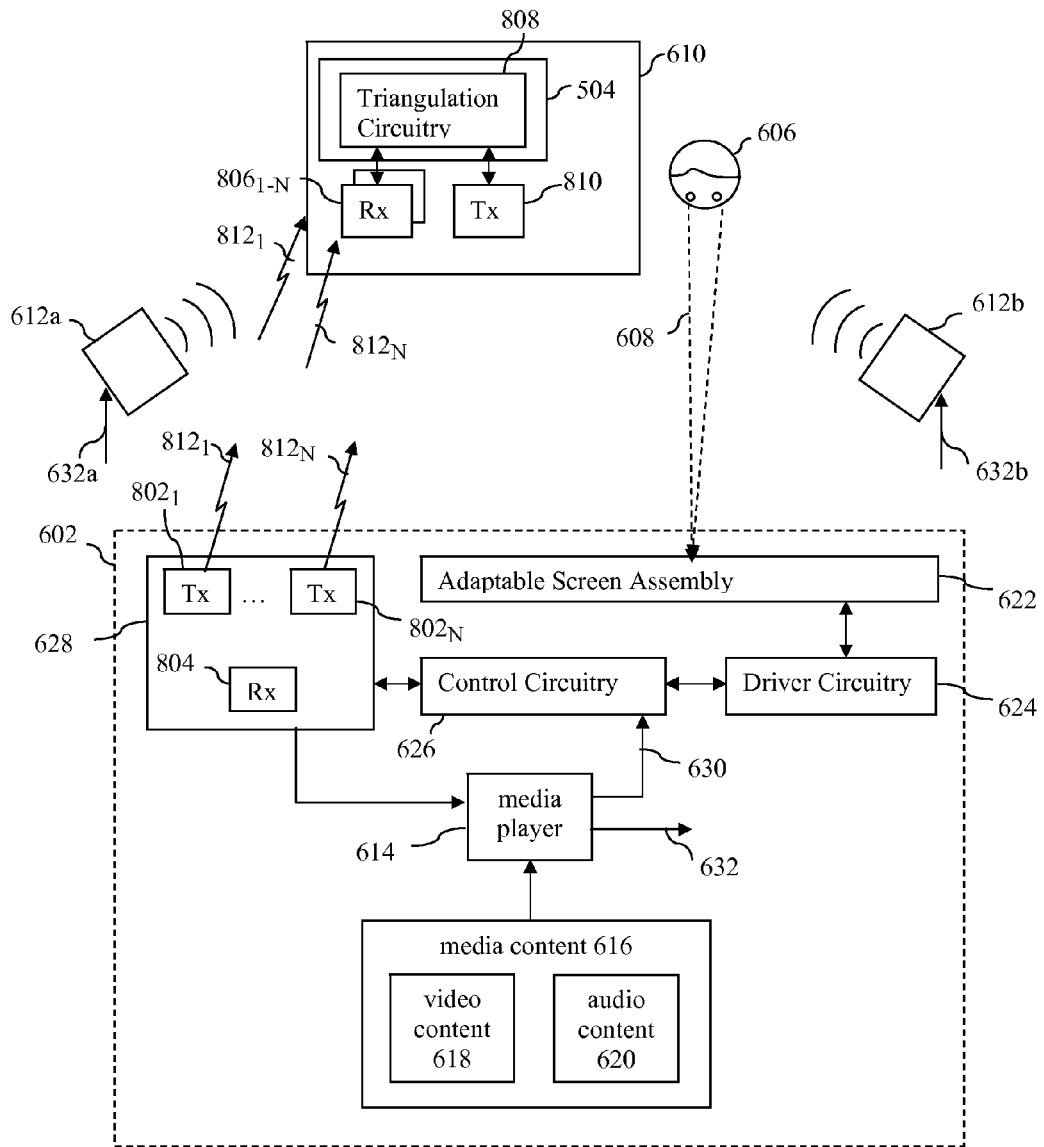
FIG. 8 is a block diagram of an audio visual system in accordance with an embodiment that includes processing circuitry that implements a triangulation technique to determine an estimated location of a viewer.

FIG. 8 is a block diagram of an embodiment of an audio visual environment in which processing circuitry 504 and processing circuitry 628 jointly implement a triangulation technique to determine an estimated location of viewer 606 relative to adaptable screen assembly 622. As shown in FIG. 8, in accordance with this embodiment, processing circuitry 628 of audio visual system 602 includes a plurality of transmitters $802_1$-$802_N$ that are operable to transmit a corresponding location tracking signal $812_1$-$812_N$. Location tracking signals $812_1$-$812_N$ may comprise, for example, RF signals or other wireless signals. In further accordance with the embodiment shown in FIG. 8, remote control device 610 includes processing circuitry 504, a plurality of receivers $806_1$-$806_N$ and a transmitter 810. Furthermore, processing circuitry 504 includes location support circuitry 808 that is coupled to receivers $806_1$-$806_N$ and transmitter 810. Receivers $806_1$-$806_N$ and transmitter 810 may be included in communication interface 502 (FIG. 4). Receivers $806_1$-$806_N$ are operable to receive corresponding location tracking signals $812_1$-$812_N$. Location support circuitry 808 is operable to determine an estimated location of viewer 606 based on characteristics of the received location tracking signals $812_1$-$812_N$. For example, location support circuitry 808 may determine the estimated location of viewer 606 by determining a distance to each of transmitters $802_1$-$802_N$ based on the location signals received therefrom, although this is only an example. The estimated location of viewer 606 is then provided by location support circuitry 808 to processing circuitry 628 via a wired or wireless communication channel established between transmitter 810 and a receiver 804 of processing circuitry 628 at audio visual system 602. Processing circuitry 628 provides the estimated location of viewer 606 to control circuitry 626 as part of the above-described location information.

Transmitters $802_1$-$802_N$ are operable to transmit location tracking signals $812_1$-$812_N$ on an on-going basis. For example, transmitters $802_1$-$802_N$ may be configured to automatically transmit location tracking signals $812_1$-$812_N$ on a periodic or continuous basis. Alternatively, transmitters $802_1$-$802_N$ may intermittently transmit location tracking signals $812_1$-$812_N$ responsive to certain activities of viewer 606 or other events. Location support circuitry 808 is operable to calculate an updated estimate of the location of viewer 606 based on the versions of location tracking signals $812_1$-$812_N$ received over time. Because processing circuitry 504 comprises viewer-located circuitry, as viewer 606 moves around the viewing area in front of adaptable screen assembly 622, location support circuitry 808 is able to produce updated estimates of the location of viewer 606, transmitter 810 can transmit such updated estimates to be received by receiver 804, and provided to control circuitry 626 and/or media player 614. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606.

As will be understood by persons skilled in the relevant art(s), to perform the triangulation function accurately, certain positioning of and/or spacing between transmitters $802_1$-$802_N$ may be required. Depending upon the implementation, each of the transmitters $802_1$-$802_N$ may be included at fixed locations within a single housing and the housing may be placed in a particular location to achieve satisfactory or optimal results. Alternatively, separate housings may be used to contain different ones of transmitters $802_1$-$802_N$ and may be placed at different locations in or around the viewing area to achieve satisfactory or optimal results. Transmitters 802 may transmit any suitable type and/or frequency signal for location tracking signals 812. For instance, in one embodiment, location tracking signals 812 may be UWB (ultra wide band) signals (UWB has demonstrated "location" performance within buildings where other transmission approaches have had difficulty) or other frequency/type signals. Furthermore, transmitters 802 and receivers 806 may optionally also be used for other types of transmissions unrelated to location determination, such as for transmitting of content related information (e.g., program guides, phone calls, texting, etc.).

Figure 9:
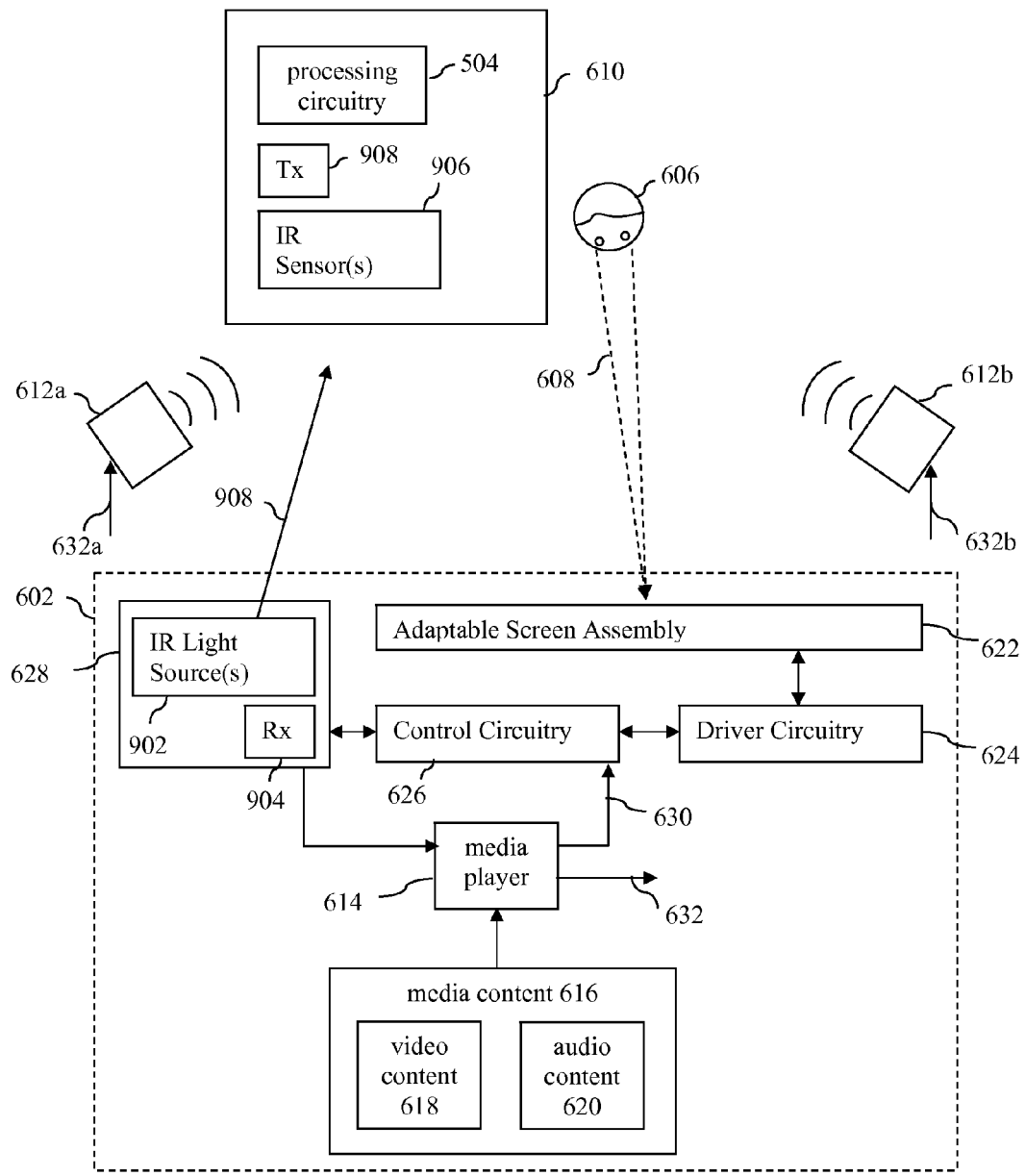
FIG. 9 is a block diagram of an audio visual system in accordance with an embodiment that includes processing circuitry that implements an infrared (IR) distance measurement system to help determine an estimated location of a viewer.

FIG. 9 is a block diagram of a further embodiment of an audio visual environment in which processing circuitry 504 and processing circuitry 628 jointly implement an infrared (IR) distance measurement system to help determine an estimated location of viewer 606 relative to adaptable screen assembly 622. As shown in FIG. 9, in accordance with this embodiment, processing circuitry 628 of audio visual system 602 includes one or more IR light sources 902 and remote control device 610 includes processing circuitry 504, one or more IR sensors 906, and a transmitter 908. IR sensor(s) 906 may be included in sensor(s) 506 and transmitter 908 may be included in communication interface 502 of FIG. 5. IR sensor(s) 906 are configured to sense IR light 908 emitted by IR light sources 902. Processing circuitry 504 may analyze characteristics associated with sensed IR light 908 to participate in generating information concerning an estimated location of viewer 606 with respect to adaptable screen assembly 622. For example, in an embodiment, processing circuitry 504 may determine the location of viewer 606 based on sensed IR light 908. Alternatively, processing circuitry 504 may transmit information regarding sensed IR light 908 to audio visual system 602 via transmitter 908 (e.g., received by receiver 904), and processing circuitry 628 may determine the location of viewer 606 based on the received information. Processing circuitry 628 may provide an instruction regarding the estimated location of viewer 606 to control circuitry 626. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606.

In alternate implementations, an IR-based distance measurement system may be implemented by incorporating one or more IR light sources into processing circuitry 628 and incorporating one or more IR sensors into processing circuitry 504. In a still further implementation, audio visual system 602 may include one or more IR light sources for projecting IR light toward the viewing area and one or more IR sensors for sensing IR light reflected from objects in the viewing area. Characteristics of the IR light reflected from the objects in the viewing area may then be analyzed to help estimate a current location of viewer 606. A like system could also be implemented in remote control device 610, except that the IR light is projected out from the viewer's location instead of toward the viewing area. Still other IR distance measurement systems may be used to generate the aforementioned location information.

Figure 10:
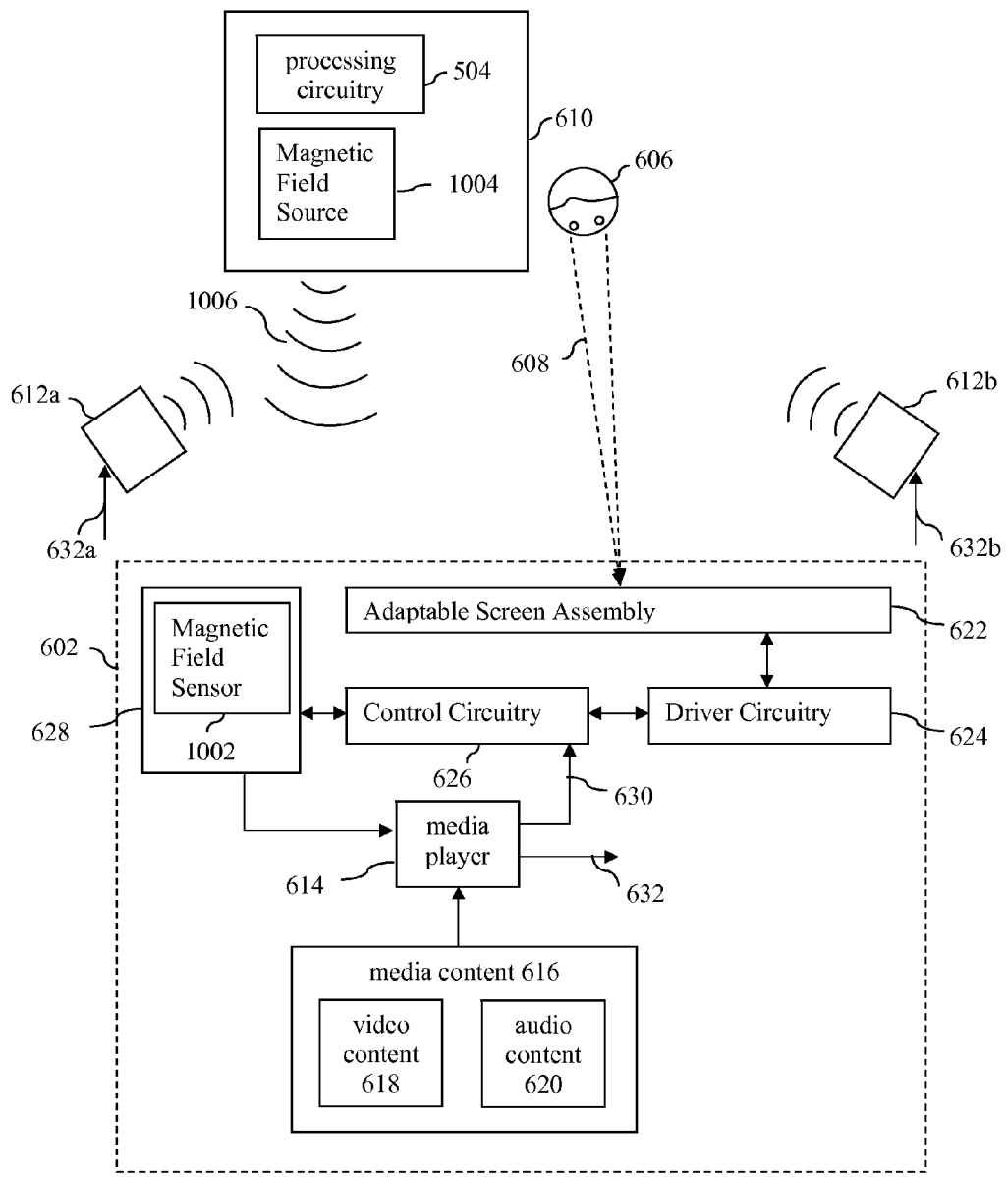
FIG. 10 is a block diagram of an audio visual system in accordance with an embodiment that includes information generation circuitry that implements a magnetic field detection system to help determine an estimated location of viewer.

FIG. 10 is a block diagram of a further embodiment of an audio visual environment in which processing circuitry 504 and processing circuitry 628 jointly implement a magnetic field detection system to help determine an estimated location of viewer 606 relative to adaptable screen assembly 622. As shown in FIG. 10, in accordance with this embodiment, remote control device 610 includes processing circuitry 504 and a magnetic field source 1004, and processing circuitry 628 at audio visual system 602 includes a magnetic field sensor 1002. Magnetic field sensor 1002 is configured to sense a magnetic field generated by magnetic field source 1004 and to analyze characteristics associated therewith to help generate information concerning an estimated location of viewer 606 with respect to adaptable screen assembly 622. The estimated location of viewer 606 may then be provided by processing circuitry 628 to control circuitry 626 as part of the above-described location information. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606.

Figure 11:
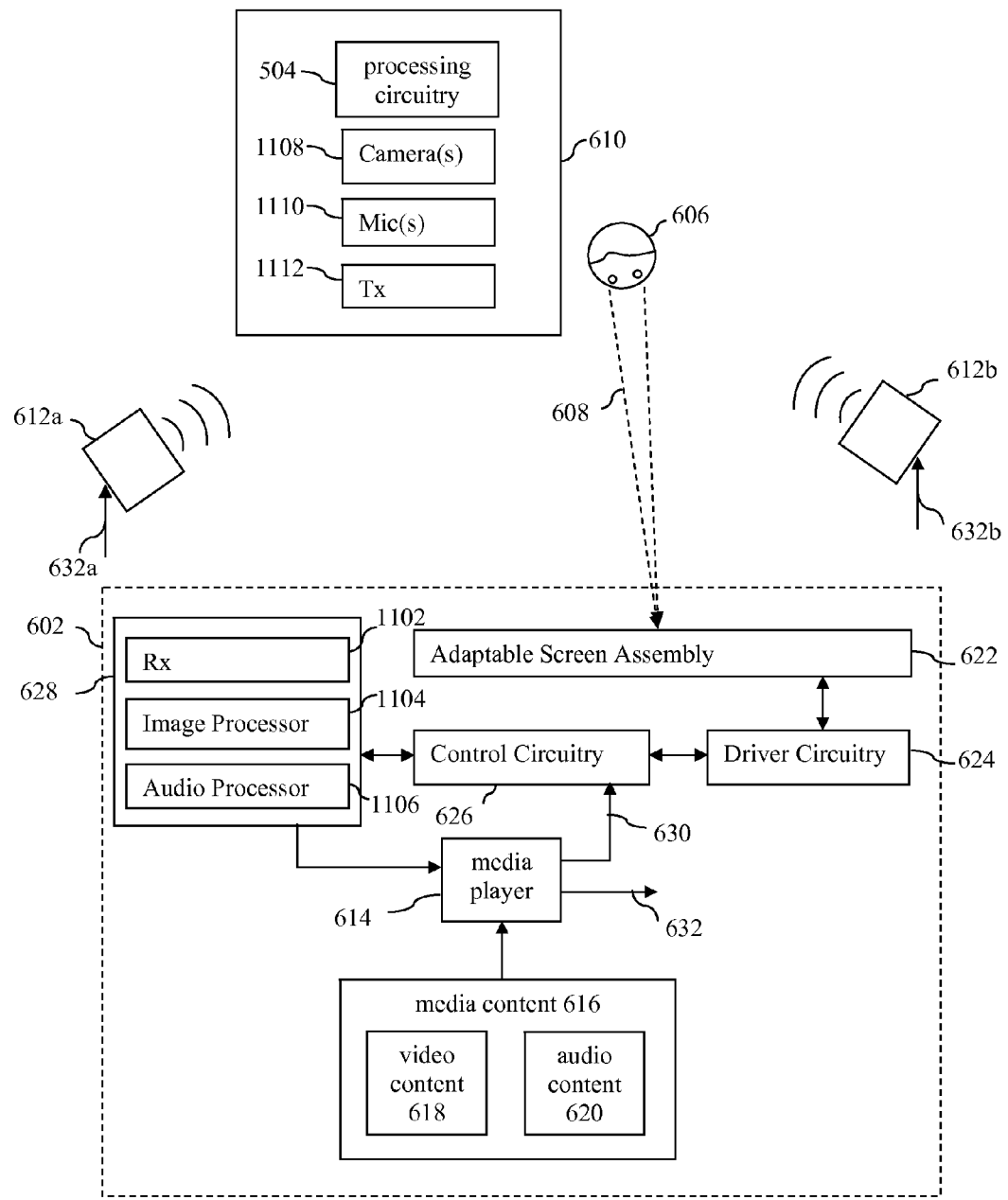
FIG. 11 is a block diagram of an audio visual system in accordance with an embodiment that includes viewer-located processing circuitry that includes one or more cameras and one or more microphones for facilitating the generation of location information corresponding to at least one aspect of a viewing reference of a viewer.

FIG. 11 is a block diagram of a further embodiment of an audio visual environment in which remote control device 610 includes one or more cameras and one or more microphones for facilitating the generation of the aforementioned location information. In particular, as shown in FIG. 11, remote control device 610 includes processing circuitry 504, one or more cameras 1108, one or more microphones 1110, and a transmitter 1112. Transmitter 1112 may be included in communication interface 502, and camera(s) 1108 and microphone(s) 1110 are examples of sensor(s) 506 of FIG. 5. Furthermore, as shown in FIG. 11, processing circuitry 628 of audio visual system 602 includes a receiver 1102, an image processor 1104, and an audio processor 1106. These features of FIG. 11 are described as follows.

Camera(s) 1108 is configured to capture images of the viewing environment of viewer 606 so as to enable a location of viewer 606 to be ascertained. These images may be processed by image processing circuitry of processing circuitry 504, and/or may be transmitted by transmitter 1112 to receiver 1102 at audio visual system 602 via a wired or wireless communication channel, and processed by image processor 1104. Image processor 1104 may process such images to determine a current estimated location and/or head orientation of viewer 606. For example, processing circuitry 504 and/or image processor 1104 may compare such images to one or more reference images in order to determine a current estimated location and/or head orientation of viewer 606. The reference images may comprise, for example, images of adaptable screen assembly 622 or other objects or points of interest normally viewable by a viewer of audio visual system 602 captured from one or more locations and at one or more orientations within the viewing area. As another example, processing circuitry 504 and/or image processor 1104 may calculate measurements associated with representations of objects or points of interest captured in such images and then compare those measurements to known measurements associated with the objects or points of interest to determine a current estimated location and/or head orientation of viewer 606. Still other techniques may be used to process such images to determine an estimated current location and/or head orientation of viewer 606.

Image processor 1104 may provide the estimated location and/or head orientation of viewer 606 to control circuitry 626 as part of the above-described location information. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606. It is noted that the images captured by camera(s) 1108 and/or processed by processing circuitry 504 and/or image processor 1104 need not comprise images of the type intended for viewing by human eyes. Rather, such images may comprise images of a resolution or frequency range that is beyond the rods/cones capability of the human eye.

In a further embodiment, images of adaptable screen assembly 622 captured by camera(s) 1108 may be processed by the image processing circuitry of processing circuitry 504 and/or by image processor 1104 to determine or measure one or more qualities relating to how adaptable screen assembly is currently presenting two-dimensional or three-dimensional content to viewer 606. Such qualities may include but are not limited to image sharpness, brightness, contrast, resolution, and colors. Processing circuitry 504 and/or image processor 1104 generate optical test information concerning the determined or measured qualities to control circuitry 626. If processing circuitry 504, image processor 1104, and/or control circuitry 626 determines that a particular quality of the presentation is not acceptable, control circuitry 626 can implement changes to one or more of the adaptable display characteristics of adaptable screen assembly 622 to adjust that particular quality until deemed acceptable. In this manner, audio visual system 602 can implement an image-based feedback mechanism for improving the quality of presentation of two-dimensional and three-dimensional content to a viewer.

For instance, in an embodiment, remote control device 610 may initiate an optical test by a user interacting with a user interface of remote control device 610 (e.g., viewer input interface 508 in FIG. 5), or the optical test may be automatically initiated, such as when audio visual system 602 is first powered up or installed, at periodic intervals, and/or at any other time. During the optical test, adaptable screen assembly 622 may display one or more test symbols, which may include any configuration and number of illuminated pixels. The test symbol(s) may have a predefined shape, color, resolution, 3D depth, etc. Camera(s) 1108 of remote control device 610 may capture one or more images of the test symbols. For instance, viewer 606 may hold remote control device 610 in a relaxed position, such as shown in FIG. 3, or may hold remote control device 610 near the eyes of viewer 606, and may peer through one or more eyepieces of remote control device 610, such as shown in FIG. 4. Viewer 606 may view the test symbols through the eyepiece(s) when the image(s) is/are captured. In this manner, optical test information is captured for images received at the eyes of viewer 606, and thus adaptable screen assembly 622 may be reconfigured to provide views that are optimized for the location of the eyes of viewer 606.

Processing circuitry 504 may analyze the captured image(s) at a high level and/or at an individual pixel level. Processing circuitry 504 may compare the captured images of the test symbols to stored test symbol information (e.g., example desired colors, resolution, brightness, sharpness, etc.), and may generate instructions (e.g., optical modification instructions 634) to instruct control circuitry 626 to reconfigure one or more display characteristics of adaptable screen assembly 622 (e.g., adjusting pixel colors, resolution, pixel brightness, sharpness, parallax barrier slit widths, slit numbers, and/or other parallax barrier characteristics, lenticular lens width and/or other lenticular lens characteristics, backlighting brightness and/or other backlighting characteristics, etc.). Such instructions may be configured according to the particular type and configuration of adaptable screen assembly 622. Alternatively, processing circuitry 504 may transmit (via transmitter 1112) captured image information to be received by processing circuitry 628 (via receiver 1102) at audio visual system 602, and processing circuitry 628 may process the captured images in this manner, and generate the instructions for control circuitry 626.

Microphone(s) 1110 operate to capture one or more audio signal(s) which are transmitted by transmitter 1112 to receiver 1102 in processing circuitry 628. Such audio signal(s) may be processed by audio processing circuitry of processing circuitry 504, and/or may be transmitted by transmitter 1112 to receiver 1102 at audio visual system 602 via a wired or wireless communication channel, and processed by audio processor 1106. Processing circuitry 504 and/or audio processor 1106 may process such audio signal(s) to determine a current estimated location and/or head orientation of viewer 606. For example, processing circuitry 504 and/or audio processor 1106 may process such audio signal(s) to determine a direction of arrival associated with one or more known audio source(s) (e.g., speakers) located in or around the viewing environment. Such directions of arrival may then be utilized to estimate a current location and/or head orientation of viewer 606. Still other techniques may be used to process such audio signal(s) to determine an estimated current location and/or head orientation of viewer 606.

Audio processor 1106 then provides the estimated location and/or head orientation of viewer 606 to control circuitry 626 as part of the above-described location information. Control circuitry 626 may cause modification of at least one of the one or more adaptable display characteristics of adaptable screen assembly 622 so that three-dimensional content will be displayed in a manner that is suitable or optimized for viewing at the current estimated location of viewer 606. Media player 614 may generate/modify speaker drive signals 632 to cause modification of one or more audio broadcast characteristics of loudspeakers 612 that is suitable or optimized for listening at the current estimated location of viewer 606.

In a further embodiment, audio signal(s) captured by microphone(s) 1110 are processed by audio processor 1106 to determine or measure one or more qualities relating to how a sound system (not shown in FIG. 11) associated with audio visual system 602 is currently presenting audio content to viewer 606. Such qualities may include but are not limited to loudness, balance, surround-sound and audio spatialization performance. Processing circuitry 404 and/or audio processor 1106 provides audio test information concerning the determined or measured qualities to control circuitry 626. If processing circuitry 504, audio processor 1106, and/or control circuitry 626 determines that a particular quality of the presentation is not acceptable, control circuitry 626 can implement changes to one or more settings or characteristics of the sound system to adjust that particular quality until it is deemed acceptable. In this manner, audio visual system 602 can implement an audio-based feedback mechanism for improving the quality of presentation of audio content to a viewer.

For instance, in an embodiment, remote control device 610 may initiate an audio test by a user interacting with a user interface of remote control device 610 (e.g., viewer input interface 508 in FIG. 5), or the audio test may be automatically initiated, such as when audio visual system 602 is first powered up or installed, at periodic intervals, and/or at any other time. During the audio test, media player 614 may cause loudspeakers 612 to broadcast one or more test sound pulses/frequencies, which may include any configuration and number of sound pulses. The test pulses may have predefined attributes, such as volume, phase, frequency, duration, etc. Microphone(s) 1110 of remote control device 610 may capture and record the test pulses. For instance, viewer 606 may hold remote control device 610 in a relaxed position, such as shown in FIG. 3, or may hold remote control device 610 near the eyes of viewer 606, and may peer through one or more eyepieces of remote control device 610, such as shown in FIG. 4. Viewer 606 may view adaptable screen assembly 622 through the eyepiece(s) when the test pulses are captured. In this manner, audio test information is captured near the ears of viewer 606, and thus media player 614 may be reconfigured to provide audio that is optimized for the location of viewer 606.

Processing circuitry 504 may analyze the captured sound pulses in any manner For instance, a series of test sound pulses of different frequencies may be emitted from each loudspeaker 612. Processing circuitry 504 may compare the captured sound pulses to stored test pulse information (e.g., desired volume, phase, frequency, pitch, etc.) to that each loudspeaker is tested and may be individually reconfigured. Processing circuitry 504, and may generate instructions (e.g., audio modification instructions 638) to instruct media player 614 to reconfigure one or more of speaker drive signals 632 (e.g., adjusting volume, phase, frequency, pitch, and/or other audio characteristic) to correspondingly reconfigure one or more of loudspeakers 612. Such instructions may be configured according to the particular type and configuration of media player 614 and loudspeakers 612. Alternatively, processing circuitry 504 may transmit (via transmitter 1112) captured audio information corresponding to the test sound pulses to be received by processing circuitry 628 (via receiver 1102) at audio visual system 602, and processing circuitry 628 may process the captured test pulses in this manner, and generate the instructions for media player 614.

In a still further embodiment, microphone(s) 1110 may be used to allow viewer 606 to deliver voice commands for controlling certain aspects of audio visual system 602, including the manner in which two-dimensional and three-dimensional content is presented via adaptable screen assembly 622. In accordance with such an embodiment, audio processor 1106 may comprise circuitry for recognizing and extracting such voice commands from the audio signal(s) captured by microphone(s) 1110 and passing the commands to control circuitry 626. In response to receiving such commands, control circuitry 626 may cause at least one of the one or more adaptable display characteristics of adaptable screen assembly 622 relating to the presentation of two-dimensional or three-dimensional content to be modified. Such voice commands may be used for other purposes as well, including controlling what content is delivered to viewer 606 via adaptable screen assembly 622.

In the embodiment of audio visual system 602 shown in FIG. 11, image processor 1104 and audio processor 1106 are shown as part of processing circuitry 628. It is noted that in alternate embodiments, such circuitry may instead be included within processing circuitry 504. In accordance with still further embodiments, image processing circuitry and/or audio processing circuitry may be distributed among processing circuitry 504 and 628.

Figure 12:
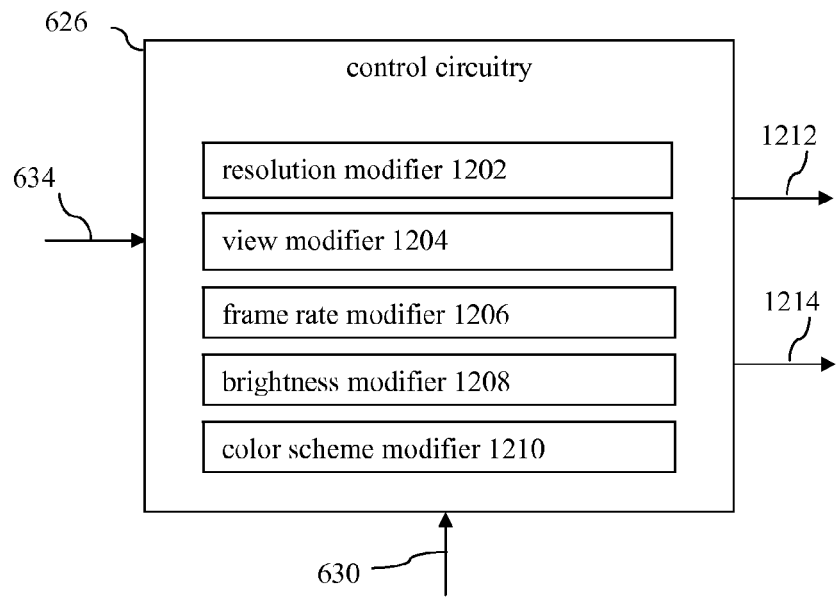
FIG. 12 shows a block diagram of control circuitry for reconfiguring an adaptable screen assembly in an audio visual system, according to an exemplary embodiment.

Control circuitry 626 may be configured in various ways to reconfigure display by adaptable screen assembly 622. For instance, FIG. 12 shows a block diagram of control circuitry 626, according to an exemplary embodiment. As shown in FIG. 12, control circuitry 626 receives video content stream 630 and optical modification instructions 324. Control circuitry 626 is configured to generate one or more control signals 1212 based at least on optical modification instructions 324, and to process video content stream 630 to generate processed video content stream 1214 based on optical modification instructions 324. Control signals 1212 may operate to reconfigure various features of adaptable screen assembly 622 based on a determined viewer location and/or optical test information, such as parallax barrier slit widths, slit numbers, and/or other parallax barrier characteristics, lenticular lens width and/or other lenticular lens characteristics, backlighting brightness and/or other backlighting characteristics, etc. Processed video content stream 1214 is a form of video content stream 630 that is modified according to instructions 324 and/or optical test information. As shown in FIG. 12, control circuitry 626 includes resolution modifier 1202, view modifier 1204, frame rate modifier 1206, brightness modifier 1208, and a color scheme modifier 1210. In embodiments, control circuitry 626 may include one or more of these components. These components of control circuitry 626 are described as follows.

Resolution modifier 1202 is configured to increase or reduce a resolution of frames of one or more frame sequences in video content stream 630 to produce one or more corresponding reduced resolution frame sequences included in processed video content stream 1214. For example, in an embodiment, resolution modifier 1202 may use techniques of image scaling to modify each frame of frame sequences having a first display pixel resolution to a second display pixel resolution, as indicated by instructions 324. For instance, resolution modifier 1202 may use upsampling or interpolating to increase resolution, and may use subsampling or downsampling to decrease resolution. For instance, when the location of viewer 606 is determined to be relatively closer to adaptable screen assembly, a relatively higher level of resolution may be provided in video content stream 630, and when the location of viewer 606 is determined to be relatively farther from adaptable screen assembly, a relatively lower level of resolution may be provided in video content stream 630.

View modifier 1204 is configured to optionally remove view data from media video content stream 630 corresponding to one or more available perspective views, when viewer 606 is viewing 3D multiview content. View modifier 1204 may perform such extraction in a continuous basis (by extracting frames from a continuous stream of frame sequences from storage or other content source for media content 616) to enable processed video content stream 1214 to be formed. Such view extraction may be performed when viewer 606 is stationary enough such that viewer 606 is not moving side-to-side to view one or more pairs of perspective views in multiview 3D content. When viewer 606 is determined to change location, view modifier 1204 may select a different set of perspective views to be provided to the viewer from video content stream 630 in processed video content stream 1214. For instance, control signal 1212 may include a control signal to change the number of views provided by adaptable screen assembly 622 (e.g. a number and arrangement of parallax barrier slits, etc.).

Frame rate modifier 1206 is configured to change a frame rate of video content stream 630 to a different frame rate in processed video content stream 1214 based on the determined location of viewer 606 and/or the optical test information. For instance, control signal 1212 may include a control signal to change the frame rate.

Brightness modifier 1208 is configured to modify a brightness of adaptable screen assembly 622 based on a brightness detected at the location of viewer 606 during the optical test and/or based on the determined location of viewer 606. For instance, control signal 1212 may include a control signal to change an emitted light intensity of backlighting and/or a pixel array of adaptable screen assembly 622.

Color scheme modifier 1210 is configured to modify color schemes (e.g., increase or reduce a number of available pixel colors) for video content stream 630 to generate processed video content stream 1214.

In further embodiments, control circuitry 626 may be configured to reconfigure additional and/or alternative display characteristics of adaptable screen assembly 622 based on instructions 634.

C. Example Viewer Identification and Viewing Premises Capture Embodiments

In embodiments, a remote control device may be capable of determining the identity of a viewer such that when the viewer handles or uses the remote control device, unique content may be made available to the viewer (or blocked, as in the case of parental controls), unique control options may be made available to the viewer, and/or unique settings relating to the presentation of audio/video may be applied. Furthermore, a tracking system may be included in an audio visual system that includes one or more sensors (including but not limited to one or more cameras, infrared sensors, ultraviolet sensors or the like) that facilitate determination of the number of viewers of a 2D-3D display. The tracking system may also track the eye position and/or orientation of each viewer relative to the display. Depending upon the implementation, the information obtained by the tracking system may then be used by the display to perform a number of functions including but not limited to: adapting the display to present requested content to each viewer in a manner that takes into account screen space constraints, bandwidth constraints, and other factors; and optimizing the display to deliver content to each user in a manner that accounts for each viewer's current eye position and/or orientation. The tracking system may or may not be integrated with the display.

Figure 13:
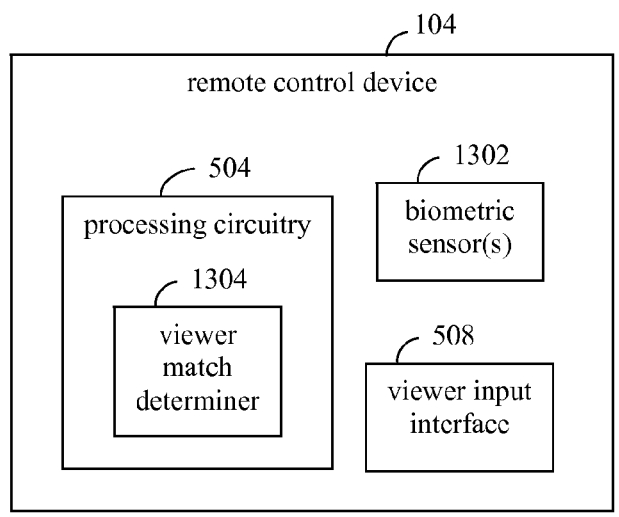
FIG. 13 shows a block diagram of a remote control device configured for viewer identification, according to an exemplary embodiment.

For instance, FIG. 13 shows a block diagram of remote control device 104 configured for viewer identification, according to an exemplary embodiment. Remote control device 104 may be configured similarly to any of the remote control device embodiments described herein. As shown in FIG. 13, remote control device 104 includes processing circuitry 504, viewer input interface 508, and one or more biometric sensors 1302. Viewer input interface 508 enables one or more viewers to register as users of remote control device 104 by inputting corresponding viewer identifying information (e.g., name, captured image, user ID, etc.). Furthermore, viewer input interface 508 may enable viewers to associate viewing preferences with their registered viewer information, such as blocked content, allowable content, 2D and/or 3D preferences, brightness, resolution, etc.

Biometric sensor(s) 1302 enable one or more biometric indicators to be captured regarding a viewer that holds remote control device 104. Remote control device 104 may store the captured biometric information in association with the stored identifying information for the viewer, and the stored biometric information may subsequently be accessed to be matched with captured biometric information to identify the viewer.

For example, as shown in FIG. 13, processing circuitry 504 includes viewer match determiner 1304. When a viewer holds remote control device 104, biometric sensor(s) 1302 capture biometric information regarding the viewer. Viewer match determiner 1304 compares the captured biometric information with a library of biometric information stored for registered users of remote control device 104 (e.g., stored in remote control device 104, or accessible in a wireless or wired manner from a storage location external to remote control device 104). If viewer match determiner 1304 determines a match for the captured biometric information with stored biometric information, viewer match determiner 1304 determines the identity of the viewer holding remote control device 104 to be that associated with the matched stored biometric information. As such, the audio visual system may be configured according to any stored viewer preferences associated with the identified viewer. If viewer match determiner 1304 does not determine a match for the captured biometric information with stored biometric information, the viewer may be denied access to remote control device 104, may be provided no restrictions in using remote control device 104, may receive standard or "guest" preferences, and/or may be treated in other manner.

Biometric sensor(s) 1302 may include one or more of various types of biometric sensor(s), including a fingerprint scanner (e.g., a thin film fingerprint scanner), one or more cameras used for facial recognition, iris or retinal recognition, one or more microphones for voice recognition, etc.

Figure 14:
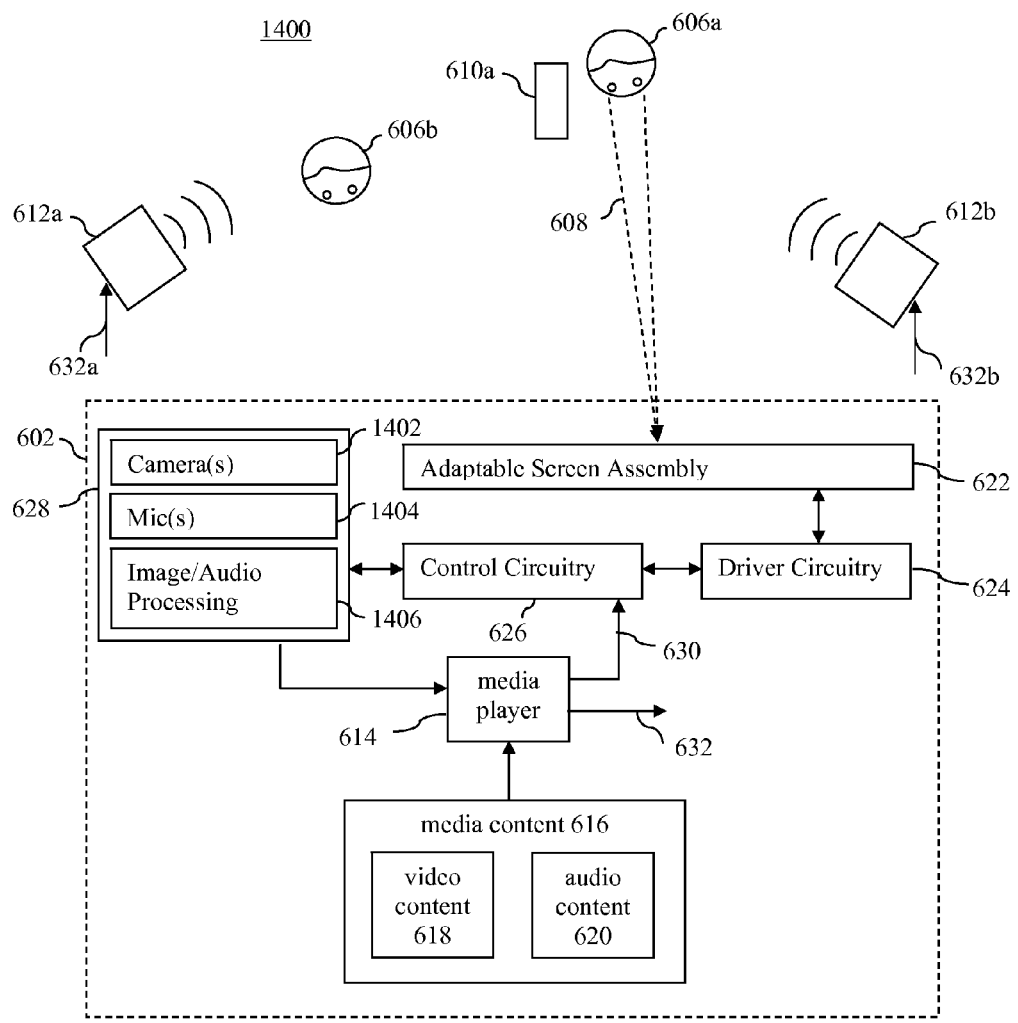
FIG. 14 is a block diagram of an audio visual system in accordance with an embodiment in which non-viewer-located camera(s) and/or microphone(s) operate to generate location information corresponding to one or more viewers.

In embodiments, viewers in an audio visual system environment may be determined and tracked in various ways. For instance, FIG. 14 is a block diagram of an embodiment of an audio visual environment 1400 in which location information is generated for one or more viewers. For instance, a number of viewers may be determined, as well as the locations of the viewers. As shown in FIG. 14, environment 1400 is similar to the configuration of FIG. 6, including audio visual system 602, remote control device 610a (associated with viewer 606a), remote control device 610b (associated with viewer 606b), and loudspeakers 612a and 612b. Audio visual system 602 includes media player 614, adaptable screen assembly 622, driver circuitry 624, control circuitry 626, and processing circuitry 628. Furthermore, processing circuitry 610 includes one or more camera(s) 1402, one or more microphone(s) 1404, and image/audio processing 1406. Two viewers 606a and 606b are shown present in environment 1400 for purposes of illustration. However, in other situations, any number of one or more viewers 606 may be present.

Camera(s) 1402 operate to capture images of a viewing area in front of adaptable screen assembly 622. The images may be captured using ambient light or, alternatively, location information generation circuitry 610 may include one or more light sources (e.g., IR light sources or other types of light sources) that operate to radiate light into the viewing area so that camera(s) 1402 may capture light reflected from people and objects in the viewing area. The images captured by camera(s) 1402 are processed by image/audio processing circuitry 1406 to determine estimated locations of viewers 606a and 606b. Similarly, microphone(s) 1404 operate to capture audio signals from audio sources located in and around the viewing area in front of adaptable screen assembly 622, such as viewers 606a and 606b. The audio signals captured by microphone(s) 1404 are also processed by image/audio processing circuitry 1406 to determine an estimated location of viewers 606a and 606b. Image/audio processing circuitry 1406 then provides the estimated location of viewers 606a and 606b to control circuitry 626 as part of the above-described location information. Control circuitry 626 will then cause modification of at least one of the one or more adaptable display characteristics of adaptable screen assembly 622 so that content, such as two-dimensional content or three-dimensional content, is displayed in a manner that is suitable or optimized for viewing at the current estimated locations of viewers 606a and 606b. Furthermore, viewers 606a and 606b may be delivered the same content or different content. Examples of adaptable display screens delivering different content to different viewers is described in co-pending, commonly owned U.S. patent application Ser. No. 12/845,461, filed on Jul. 28, 2010 and entitled "Display Supporting Multiple Simultaneous 3D Views."

The audio signal(s) captured by microphone(s) 1406 may also be processed to detect and extract voice commands uttered by viewers 606a and 606b, such voice commands being executed by control circuitry 624 to facilitate viewer control over at least one of the one or more adaptable display characteristics of adaptable screen assembly 622 relating to the presentation of two-dimensional or three-dimensional content. As noted above with respect to the embodiment shown in FIG. 8, such voice commands may be used for other purposes as well, including controlling what content is delivered to viewer 606 via adaptable screen assembly 622. Furthermore, image/audio processing 1406 may use techniques of audio/sound localization to determine the locations of viewers 606a and 606b based on sounds made by viewers 606a and 606b, such as speaking, etc.

Still further, after determining the number of viewers 606 that are present in environment 1400, and their respective locations, audio visual system 602 may adapt the adaptable screen assembly 622 to deliver requested content to each viewer in a manner that takes into account screen space constraints, bandwidth constraints, viewer preferences, and/or other factors. Furthermore, adaptable screen assembly 622 may be configured to deliver content to each user in a manner that accounts for each viewer's current eye position and/or orientation.

The various embodiments of FIGS. 6-11 and 14 have been provided herein by way of example only are not intended to be limiting. Persons skilled in the relevant art(s) will appreciate that other configurations may be used to produce location information corresponding to at least one aspect of a viewing reference of a viewer, to generate optical test information, to generate audio test information, to reconfigure and adaptable screen assembly, to reconfigure audio, to identify viewers, and to determine a number and position of viewers in an audio visual environment. It is further noted that the features described in regard to FIGS. 6-11 and 14 may be combined to produce additional embodiments. For example, an embodiment may utilize a combination of triangulation, IR distancing, head orientation sensing and eye tracking to generate extremely precise location information concerning a viewing reference of a viewer.

D. Example Hardware and Software Implementations

Embodiments may be implemented in hardware, software, firmware, or any combination thereof. For example, processing circuitry 124, processing circuitry 504, driver circuitry 624, control circuitry 626, processing circuitry 628, location support circuitry 704, location support circuitry 808, image processor 1104, audio processor 1106, and image/audio processing 1406 may each be implemented as one or more processors (e.g., CPUs, processing units, microprocessors, graphics processing units, processing logic, etc.), and/or other circuits (e.g., FPGAs (field programmable gate arrays), ASICs (application specific integrated circuits), discrete circuitry, etc.) that may or may not be configured to execute computer program code, including software or firmware. Resolution modifier 1202, view modifier 1204, frame rate modifier 1206, brightness modifier 1208, color scheme modifier 1210, and/or viewer match determiner 1304 may be implemented in hardware, software, firmware, or any combination thereof, including as computer program code configured to be executed in one or more processors and/or circuitry.

Audio visual system 102, audio visual system 602, and/or remote control devices 104, 304, 402, 610 may include any type of storage. For instance, audio visual system 102, audio visual system 602, and/or remote control devices 104, 304, 402, 610 may each include primary or main memory 4106, such as random access memory (RAM) (e.g., that stores location information, control logic (computer software), etc.). Audio visual system 102, audio visual system 602, and/or remote control devices 104, 304, 402, 610 may include one or more secondary storage devices, such as a hard disk drive and/or a removable storage device or drive, as well as other types of storage devices, such as memory cards and memory sticks. Such storage drives may represent a floppy disk drive, a magnetic tape drive, a compact disk drive, an optical storage device, tape backup, etc.

Communication interface 502 and/or other receivers and transmitters described herein may be configured to communicate according to one or more wireless communication protocols, as would be known to persons skilled in the relevant art(s), including by modulating information on radio frequency (RF) carrier signals.

Cameras 1108 and 1402 may be any suitable types of cameras, including cameras including an image sensor such as a CCD (charge coupled device), etc. Cameras 1108 and 1402 interface with corresponding processing circuitry (e.g., processing circuitry 504, 628) using camera interface circuitry, which may include circuits for transmitting captured images to the corresponding processing circuitry.

Any apparatus or manufacture comprising a computer useable or readable medium having control logic (software) stored therein is referred to herein as a computer program product or program storage device. This includes, but is not limited to, memory and storage. Such computer program products, having control logic stored therein that, when executed by one or more data processing devices, cause such data processing devices to operate as described herein, represent embodiments of the invention. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for processing circuitry 504, driver circuitry 624, control circuitry 626, processing circuitry 628, location support circuitry 704, location support circuitry 808, image processor 1104, audio processor 1106, image/audio processing 1406, resolution modifier 1202, view modifier 1204, frame rate modifier 1206, brightness modifier 1208, color scheme modifier 1210, viewer match determiner 1304 and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

Figure 15:
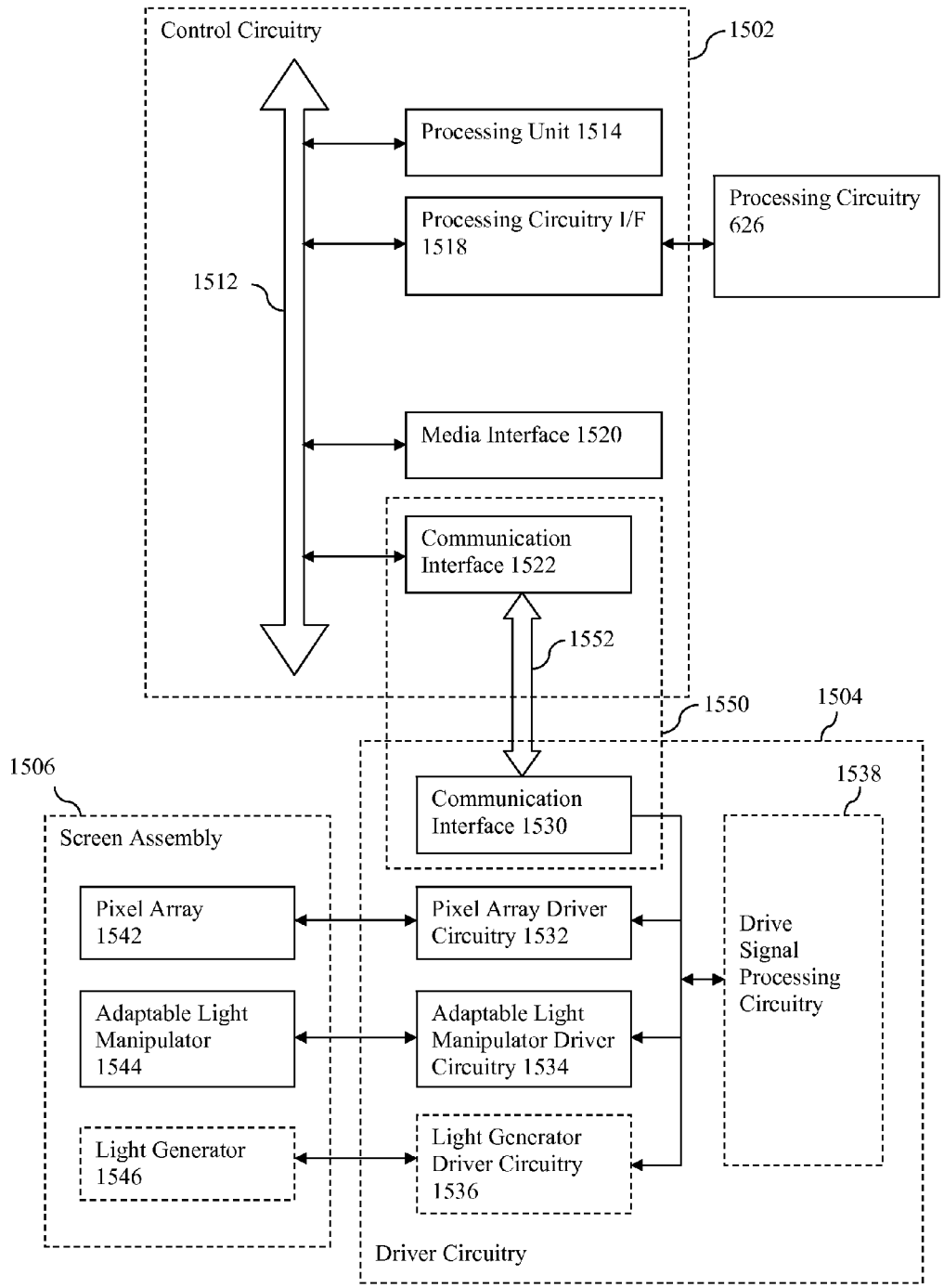
FIG. 15 is a block diagram of an example implementation of an adaptable two-dimensional/three-dimensional display system in accordance with an embodiment.

FIG. 15 is a block diagram of an example implementation of a display system 1500 that includes an adaptable screen assembly that supports the simultaneous display of multiple visual presentations in accordance with an embodiment. Display system 1500 is an example embodiment for the audio visual systems described herein. As shown in FIG. 15, display system 1500 generally comprises control circuitry 1502, driver circuitry 1504 and an adaptable screen assembly 1506.

As shown in FIG. 15, control circuitry 1502 includes a processing unit 1514, which may comprise one or more general-purpose or special-purpose processors or one or more processing cores. Processing unit 1514 is connected to a communication infrastructure 1512, such as a communication bus. Control circuitry 1502 may also include a primary or main memory (not shown in FIG. 15), such as random access memory (RAM), that is connected to communication infrastructure 1512. The main memory may have control logic stored thereon for execution by processing unit 1514 as well as data stored thereon that may be input to or output by processing unit 1514 during execution of such control logic.

Control circuitry 1502 may also include one or more secondary storage devices (not shown in FIG. 15) that are connected to communication infrastructure 1512, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 1514 as well as data that may be input to or output by processing unit 1514 during execution of such control logic.

Control circuitry 1502 further includes a processing circuitry interface 1518 that is connected to communication infrastructure 1512. Processing circuitry interface 1518 is configured to receive signals from processing circuitry, such as processing circuitry 626, which provides instructions based on remote control device operation. Processing unit 1514 or other processing circuitry within control circuitry 1502 may be configured to interpret such instructions and to perform certain operations based on the instructions. Such actions may include, for example, modifying a particular visual presentation being displayed by adaptable screen assembly 1506 or obtaining media content for presentation via a particular view supported by adaptable screen assembly 1506.

Media interface 1520 is intended to represent any type of interface that is capable of receiving media content such as video content or image content. In certain implementations, media interface 1520 may comprise an interface for receiving media content from a remote source such as a broadcast media server, an on-demand media server, or the like. In such implementations, media interface 1520 may comprise, for example and without limitation, a wired or wireless internet or intranet connection, a satellite interface, a fiber interface, a coaxial cable interface, or a fiber-coaxial cable interface. Media interface 1520 may also comprise an interface for receiving media content from a local source such as a DVD or Blu-Ray disc player, a personal computer, a personal media player, smart phone, or the like. Media interface 1520 may be capable of retrieving video content from multiple sources, including media content 616.

Control circuitry 1502 further includes a communication interface 1522. Communication interface 1522 enables control circuitry 1502 to send control signals via a communication medium 1552 to another communication interface 1530 within driver circuitry 1504, thereby enabling control circuitry 1502 to control the operation of driver circuitry 1504. Communication medium 1552 may comprise any kind of wired or wireless communication medium suitable for transmitting such control signals.

As shown in FIG. 15, driver circuitry 1504 includes the aforementioned communication interface 1530 as well as pixel array driver circuitry 1532 and adaptable light manipulator(s) driver circuitry 1534. Driver circuitry also optionally includes light generator driver circuitry 1536. Each of these driver circuitry elements is configured to receive control signals from control circuitry 1502 (via the link between communication interface 1522 and communication interface 1530) and, responsive thereto, to send selected drive signals to a corresponding hardware element within adaptable screen assembly 1506, the drive signals causing the corresponding hardware element to operate in a particular manner. In particular, pixel array driver circuitry 1532 is configured to send selected drive signals to a pixel array 1542 within adaptable screen assembly 1506, adaptable light manipulator(s) driver circuitry 1534 is configured to send selected drive signals to one or more adaptable light manipulators 1544 within adaptable screen assembly 1506, and optional light generator driver circuitry 1536 is configured to send selected drive signals to an optional light generator 1546 within adaptable screen assembly 1506.

In one example mode of operation, processing unit 1514 operates pursuant to control logic to receive media content via media interface 1520 and to generate control signals necessary to cause driver circuitry 1504 to render such media content to screen 1506 in accordance with a selected viewing configuration. For example, processing unit 1514 may operate pursuant to control logic to receive first and second media content via media interface 1520 and present the first and second media content via first and second simultaneously-displayed views of adaptable screen assembly 1506 to corresponding first and second viewers, wherein at least the first view is observable by the first viewer but not the second viewer. Processing unit 1514 may cause such views to be delivered to certain locations based on information obtained from viewer tracking unit 1516. The control logic that is executed by processing unit 1514 may be retrieved, for example, from a primary memory or a secondary storage device connected to processing unit 1514 via communication infrastructure 1512 as discussed above. The control logic may also be retrieved from some other local or remote source. Where the control logic is stored on a computer readable medium, that computer readable medium may be referred to herein as a computer program product.

Among other features, driver circuitry 1504 may be controlled to send coordinated drive signals necessary for simultaneously displaying two-dimensional images, three-dimensional images and multi-view three-dimensional content via adaptable screen assembly 1506. A manner by which pixel array 2642, adaptable light manipulator 2644 (e.g., an adaptable parallax barrier), and light generator 2646 may be manipulated in a coordinated fashion to perform this function is described in commonly-owned, co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein. Note that in accordance with certain implementations (e.g., implementations in which pixel array comprises an OLED/PLED pixel array), adaptable screen assembly 1506 need not include light generator 1546.

In one embodiment, at least part of the function of generating control signals necessary to cause pixel array 1542, adaptable light manipulator 1544 and light generator 1546 to render media content to screen 1506 in accordance with a selected viewing configuration is performed by drive signal processing circuitry 1538 which is integrated within driver circuitry 1504. Such circuitry may operate, for example, in conjunction with and/or under the control of processing unit 1514 to generate the necessary control signals.

In certain implementations, control circuitry 1502, driver circuitry 1504 and adaptable screen assembly 1506 are all included within a single housing. For example and without limitation, all these elements may exist within a television, a laptop computer, a tablet computer, or a telephone. In accordance with such an implementation, the link 1550 formed between communication interfaces 1522 and 1530 may be replaced by a direction connection between driver circuitry 1504 and communication infrastructure 1512. In an alternate implementation, control circuitry 1502 is disposed within a first housing, such as set top box or personal computer, and driver circuitry 1504 and adaptable screen assembly 1506 are disposed within a second housing, such as a television or computer monitor. The set top box may be any type of set top box including but not fiber, Internet, cable, satellite, or terrestrial digital.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. Remote control circuitry of a remote control device that supports interaction by a viewer with a screen assembly of a display device, the remote control device being held by the viewer during the interaction, the viewer having eyes, the eyes of the viewer having a first position within a premises relative to the screen assembly of the display device, the remote control device having a second position within the premises relative to the screen assembly of the display device, the remote control circuitry comprising:

an input interface that enables the viewer to select content to be viewed;

a communication interface that supports wireless transmissions;

processing circuitry that automatically determines the first position of the eyes of the viewer based at least on the second position of the remote control device, the second position of the remote control device being proximate to the viewer;

the processing circuitry causing the communication interface to make at least one wireless transmission relating to the determination of the first position; and the processing circuitry, at least in part, causes a display characteristic of the display device to be changed based on the first position.

2. The remote control circuitry of claim 1, further comprising camera interface circuitry.

3. The remote control circuitry of claim 1, wherein the processing circuitry assists in a detection relating to the second position of the remote control device within the premises to determine the first position.

4. The remote control circuitry of claim 1, wherein the second position of the remote control device is determined external to the remote control device based on the at least one wireless transmission.

5. The remote control circuitry of claim 1, wherein the communication interface receives a plurality of wireless transmissions, and the processing circuitry determines the second position of the remote control device based on the received wireless transmissions.

6. The remote control circuitry of claim 1, wherein at least one sensor component of the remote control device detects a hand of the viewer in contact with the remote control device.

7. The remote control circuitry of claim 1, wherein the processing circuitry generates at least one command based on the first position to change the display characteristic of the display device, and the communication interface transmits the at least one command from the remote control device.

8. The remote control circuitry of claim 1, wherein the remote control device includes at least one camera that captures at least one image of at least a portion of the screen assembly, the at least one image used to determine the first position.

9. The remote control circuitry of claim 8, wherein the remote control device includes at least one eyepiece, wherein the viewer is enabled to capture the at least one image of a portion of the screen assembly using the at least one camera while the at least one eyepiece is held in alignment with at least one eye of the viewer viewing the screen assembly through the at least one eyepiece.

10. The remote control circuitry of claim 8, wherein the captured at least one image includes an image of a test symbol displayed by the screen assembly.

11. The remote control circuitry of claim 1, wherein the display characteristic is a light manipulation characteristic of the screen assembly.

12. The remote control circuitry of claim 11, wherein the light manipulation characteristic relates to a three-dimensional presentation.

13. The remote control circuitry of claim 1, further comprising:
at least one sensor component configured to capture information associated with the viewer;
wherein the input interface includes a display;
wherein the processing circuitry is configured to at least participate in a determination of an orientation of the eyes of the viewer;
wherein the selected content is displayed by at least one of the screen assembly or the display based on the determined orientation.

14. The remote control circuitry of claim 13, wherein the selected content is web content.

15. A method in a remote control device to support interaction by a viewer with a screen assembly of a display device, the remote control device being held by the viewer during the interaction, the viewer having eyes, the eyes of the viewer having a first position within a premises relative to the screen of the display device, the remote control device having a second position within the premises relative to the screen of the display device, the method comprising:
receiving a selection input by the viewer via an input interface of the remote control device to select content to be viewed;
automatically generating location information that indicates the first position of the eyes of the viewer based at least on the second position of the remote control device, the second position of the remote control device being proximate to the viewer;
making at least one wireless transmission including the location information; and
causing, at least in part, delivery of the content to be displayed via the display device based at least on the first position indicated by the location information and causing a display characteristic of the display device to be changed.

16. The method of claim 15, wherein the generation of the location information that indicates the first position comprises assisting in a detection relating to the second position of the remote control device within the premises.

17. The method of claim 15, further comprising:
causing a reconfiguration of the screen assembly based on the location information, the reconfiguration comprising changing a light manipulation characteristic of the screen assembly.

18. The method of claim 17, wherein the light manipulation characteristic relates to a three-dimensional presentation.

19. A system, comprising:
one or more processors; and
a memory containing computer-readable instructions, which, when executed by the processor, are configured to:
receive a selection input by a viewer via an input interface of a remote control device to select content to be viewed, the remote control device supporting interaction by the viewer with a screen assembly of a display device, the viewer having eyes that have a first position within a premises relative to the screen assembly of the display device, the remote control device having a second position within the premises relative to the screen assembly of the display device, the second position being at least one of being in reach of the viewer or being in a hand of the viewer;
automatically generate location information that indicates the first position of the eyes of the viewer based at least on the second position of the remote control device;
make at least one wireless transmission including the location information; and
cause, at least in part, delivery of the content to be displayed via the display device based at least on the first position indicated by the location information, and cause a display characteristic of the display device to be changed.

20. The system of claim 19, wherein the computer-readable instruction, which, when executed by the one or more processors, are further configured to:
cause a reconfiguration of the screen assembly based on the location information, the reconfiguration comprising changing a light manipulation characteristic of the screen assembly.

* * * * *

UNITED STATES PATENT AND TRADEMARK OFFICE
CERTIFICATE OF CORRECTION

PATENT NO. : 8,823,782 B2  
APPLICATION NO. : 12/982102  
DATED : September 2, 2014  
INVENTOR(S) : Karaoguz et al.

Page 1 of 1

It is certified that error appears in the above-identified patent and that said Letters Patent is hereby corrected as shown below:

In the Specification

Col. 1, line 49: replace "; and" with "."

Signed and Sealed this  
Thirtieth Day of December, 2014

Michelle K. Lee  
*Deputy Director of the United States Patent and Trademark Office*